United States Patent
Lemarenko et al.

(10) Patent No.: US 10,605,943 B2
(45) Date of Patent: Mar. 31, 2020

(54) COHERENT NOISE REDUCTION IN ULTRASONIC DATA

(71) Applicant: Schlumberger Technology Corporation, Sugar Land, TX (US)

(72) Inventors: Mikhail Lemarenko, Clamart (FR); Jean-Luc Le Calvez, Clamart (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 13 days.

(21) Appl. No.: 16/131,463

(22) Filed: Sep. 14, 2018

(65) Prior Publication Data

US 2019/0302302 A1 Oct. 3, 2019

Related U.S. Application Data

(63) Continuation-in-part of application No. 15/939,364, filed on Mar. 29, 2018.

(51) Int. Cl.
*G01V 1/48* (2006.01)

(52) U.S. Cl.
CPC ........ *G01V 1/48* (2013.01); *G01V 2210/1216* (2013.01); *G01V 2210/3246* (2013.01)

(58) Field of Classification Search
CPC .............. G01V 1/48; G01V 2210/32; G01V 2210/324; G01V 2210/1216; G01V 2210/3246; G01V 2207/10132; E21B 47/091; E21B 47/14; G06T 5/002; G06T 5/20; G06T 7/30; G06T 2207/10132
USPC ................... 382/264; 367/25, 31, 35, 38, 43
See application file for complete search history.

(56) References Cited

U.S. PATENT DOCUMENTS

| | | | | |
|---|---|---|---|---|
| 4,799,200 A | * | 1/1989 | Cheung | G01V 1/50 367/30 |
| 5,274,604 A | * | 12/1993 | D'Angelo | G01V 1/50 367/35 |
| 5,859,811 A | * | 1/1999 | Miller | G01V 1/48 367/25 |
| 9,903,973 B2 | | 2/2018 | Jannin et al. | |
| 2017/0168183 A1 | | 6/2017 | Hayman et al. | |
| 2017/0168184 A1 | | 6/2017 | Le Calvez et al. | |

* cited by examiner

*Primary Examiner* — Daniel G Mariam

(57) ABSTRACT

Acoustic imaging waveforms are measured utilizing a downhole acoustic tool within a wellbore, and then aligned relative to a main echo of each waveform. The aligned waveforms are then subjected to a first low-pass filter. Residuals are extracted by determining differences between the aligned waveforms and the filtered waveforms. The residuals are aligned to corresponding acoustic firing pulses of the downhole acoustic tool. The aligned residuals are subjected to a second low-pass filter. The measured waveforms are aligned to the corresponding acoustic firing pulses. Noise associated with the downhole acoustic tool is removed from the pulse-aligned, measured waveforms utilizing the filtered residuals.

20 Claims, 20 Drawing Sheets

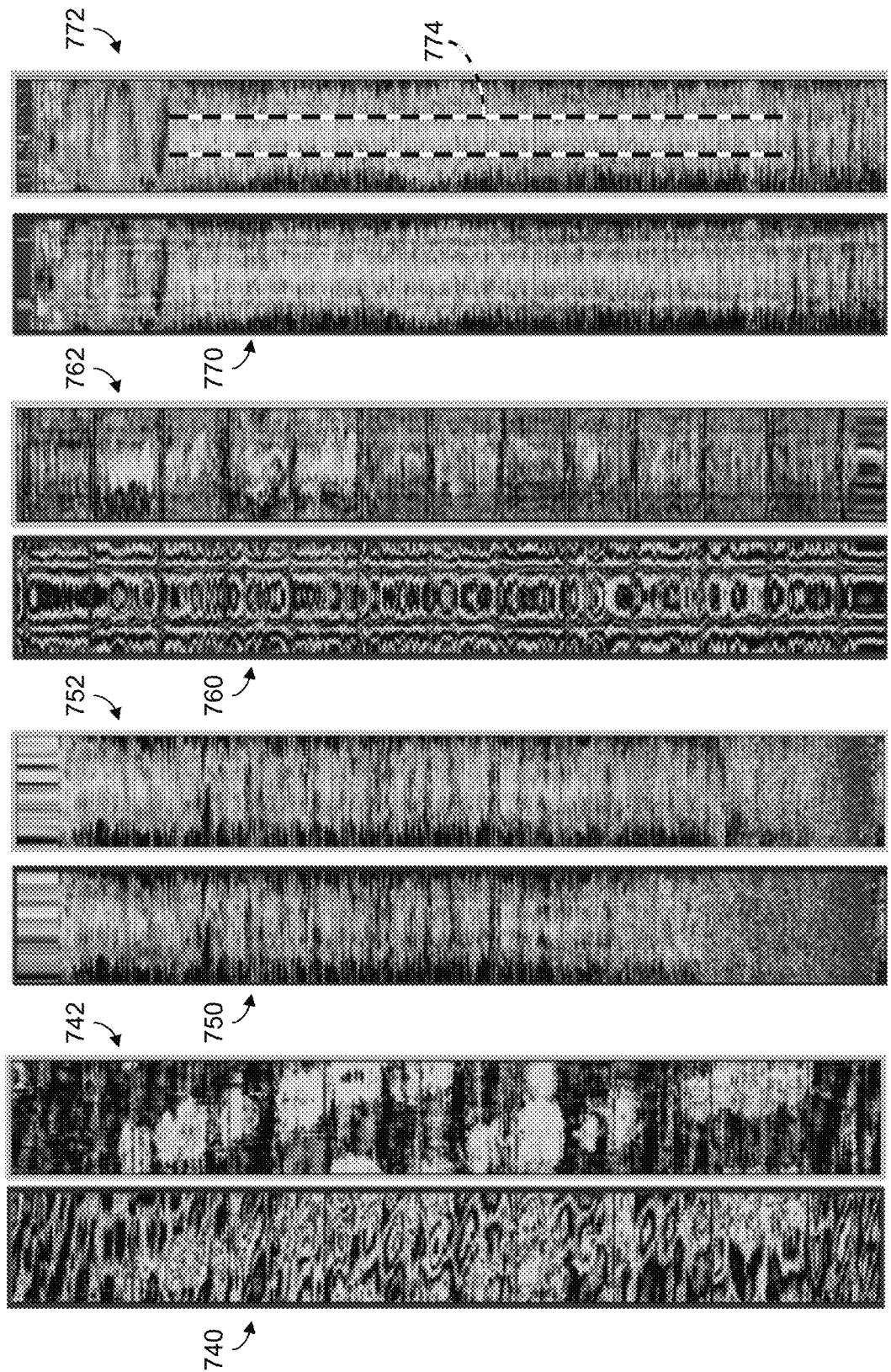

COHERENT NOISE REDUCTION IN ULTRASONIC DATA

BACKGROUND OF THE DISCLOSURE

The formation of an oil and gas well includes securing a metal casing within a wellbore via cement forming an annular structure between the sidewall of the wellbore and the outer diameter of the casing. Acoustic evaluation is often used to determine whether the cement provides hydraulic zonal isolation between formation strata traversed by the wellbore. Ultrasonic pulse-echo measurements and other acoustic measurements are used in cement evaluation, such as to provide the effective acoustic impedance of the annulus material adjacent to the casing and thereby evaluate cement characteristics and zonal isolation. For example, an ultrasonic pulse-echo tool may transmit a broadband pulse to the casing wall to excite a thickness resonance mode in the casing.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces a method including obtaining a plurality of acoustic imaging waveforms measured utilizing a downhole acoustic tool within a wellbore and aligning the plurality of measured acoustic imaging waveforms relative to a main echo of each waveform. The aligned waveforms are subjected to a first low-pass filter, and residuals are extracted by determining differences between the aligned waveforms and the filtered waveforms. The residuals are aligned relative to a characteristic time of a noise of the obtained waveforms, wherein the noise is non-coherent relative to the main echo. The aligned residuals are subjected to a second low-pass filter. The measured waveforms and filtered residuals are aligned in time relative to a reference time. The method also includes subtracting the filtered residuals aligned relative to the reference time from the measured waveforms aligned relative to the reference time in order to remove the noise. The noise removal utilizes the filtered residuals.

The present disclosure also introduces a method comprising: (A) operating a downhole acoustic tool within a wellbore to obtain a plurality of acoustic imaging waveforms, wherein the downhole acoustic tool is in communication with surface equipment disposed at a wellsite from which the wellbore extends; and (B) operating a processor of the downhole acoustic tool and/or a processor of the surface equipment to: (1) align the obtained waveforms relative to a main echo of each waveform; (2) subject the aligned waveforms to a first low-pass filter; (3) extract residuals by determining differences between the aligned waveforms and the filtered waveforms; (4) align the residuals to a characteristic time of a noise of the obtained waveforms, wherein the noise is non-coherent relative to the main echo; (5) subject the aligned residuals to a second low-pass filter; (6) align in time the filtered residuals and the measured waveforms relative to a reference time, and (7) subtract the filtered residuals aligned relative to the reference time from the measured waveforms aligned relative to the reference time in order to remove the noise.

The present disclosure also introduces a computer program product comprising a non-transitory, tangible, computer-readable storage medium having instructions recorded thereon for causing a processor to: align a plurality of acoustic imaging waveforms measured utilizing a downhole acoustic tool within a wellbore, wherein the aligning is relative to a main echo of each waveform; subject the aligned waveforms to a first low-pass filter; extract residuals by determining differences between the aligned waveforms and the filtered waveforms; align the residuals to a characteristic time of a noise of the obtained waveforms that is non-coherent relative to the main echo; subject the aligned residuals to a second low-pass filter; align in time the filtered residuals and the measured waveforms relative to a reference time, and subtract the filtered residuals aligned relative to the reference time from the measured waveforms aligned relative to the reference time in order to remove the noise.

These and additional aspects of the present disclosure are set forth in the description that follows, and/or may be learned by a person having ordinary skill in the art by reading the material herein and/or practicing the principles described herein. At least some aspects of the present disclosure may be achieved via means recited in the attached claims.

BRIEF DESCRIPTION OF THE DRAWINGS

The present disclosure is understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIGS. 20-23 are example imaging logs pertaining to one or more aspects of the present disclosure.

DETAILED DESCRIPTION

Figure 1:
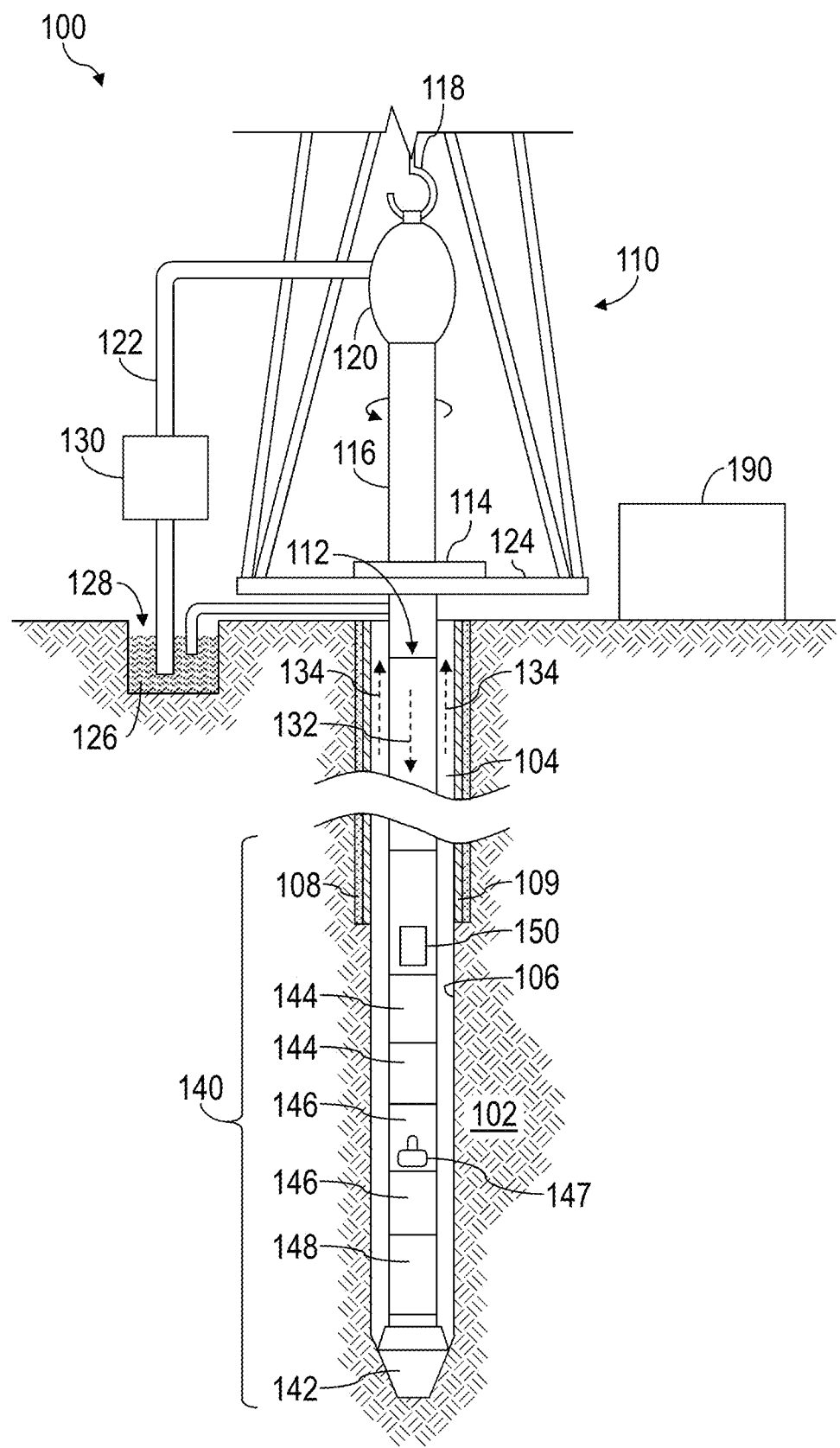
FIG. 1 is a schematic view of at least a portion of an example implementation of apparatus according to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity, and does not in itself dictate a relationship between the various embodiments and/or configurations discussed.

As described above, ultrasonic data may be polluted by several types of noise, such as tool noise (coming for perturbations inside of the tool electronics for instance), or second specular echo. This noise, as the main echo, is generally coherent (ie the waveforms generated by the noise in different measured waveforms are generally the same) but non-coherent relative to the main echo (ie the main echo waveform and the noise waveform do not present the same characteristics—for instance same phase difference-relative to each other in each of the measured waveforms). The tool noise may have for instance a pattern that is constant in time relative to the firing pulse. Nevertheless, extracting the noise is not a trivial task. The present disclosure introduces one or more aspects pertaining to removing the coherent noise from the ultrasonic log data, which may improve interpretation quality. The present disclosure uses the non-coherence (e.g. in time) of the noise relative to the main echo in order to remove the noise from the measured waveforms. Therefore, the aspects of the disclosure are described in relationship with particular types of noise but could be applied to any coherent noise that is non-coherent relative to the main echo. Additionally, although such aspects may be described below in the context of pulse-echo measurements, one or more aspects may also be applicable or ready adaptable to other types of signal measurements.

FIG. 1 is a schematic view of an example wellsite system 100 to which one or more aspects of the present disclosure may be applicable. The wellsite system 100 may be onshore or offshore. In the example wellsite system 100 shown in FIG. 1, a wellbore 104 is formed in one or more subterranean formations 102 by rotary drilling. Other example systems within the scope of the present disclosure may also or instead utilize directional drilling. While some elements of the wellsite system 100 are depicted in FIG. 1 and described below, it is to be understood that the wellsite system 100 may include other components in addition to, or instead of, those presently illustrated and described.

As shown in FIG. 1, a drillstring 112 suspended within the wellbore 104 comprises a bottom hole assembly (BHA) 140 that includes or is coupled with a drill bit 142 at its lower end. The surface system includes a platform and derrick assembly 110 positioned over the wellbore 104. The platform and derrick assembly 110 may comprise a rotary table 114, a kelly 116, a hook 118, and a rotary swivel 120. The drillstring 112 may be suspended from a lifting gear (not shown) via the hook 118, with the lifting gear being coupled to a mast (not shown) rising above the surface. An example lifting gear includes a crown block affixed to the top of the mast, a vertically traveling block to which the hook 118 is attached, and a cable passing through the crown block and the vertically traveling block. In such an example, one end of the cable is affixed to an anchor point, whereas the other end is affixed to a winch to raise and lower the hook 118 and the drillstring 112 coupled thereto. The drillstring 112 comprises one or more types of tubular members, such as drill pipes, threadedly attached one to another, perhaps including wired drilled pipe.

The drillstring 112 may be rotated by the rotary table 114, which engages the kelly 116 at the upper end of the drillstring 112. The drillstring 112 is suspended from the hook 118 in a manner permitting rotation of the drillstring 112 relative to the hook 118. Other example wellsite systems within the scope of the present disclosure may utilize a top drive system to suspend and rotate the drillstring 112, whether in addition to or instead of the illustrated rotary table system.

The surface system may further include drilling fluid or mud 126 stored in a pit or other container 128 formed at the wellsite. The drilling fluid 126 may be oil-based mud (OBM) or water-based mud (WBM). A pump 130 delivers the drilling fluid 126 to the interior of the drillstring 112 via a hose or other conduit 122 coupled to a port in the rotary swivel 120, causing the drilling fluid to flow downward through the drillstring 112, as indicated in FIG. 1 by directional arrow 132. The drilling fluid exits the drillstring 112 via ports in the drill bit 142, and then circulates upward through the annulus region between the outside of the drillstring 112 and the wall 106 of the wellbore 104, as indicated in FIG. 1 by directional arrows 134. In this manner, the drilling fluid 126 lubricates the drill bit 142 and carries formation cuttings up to the surface as it is returned to the container 128 for recirculation.

The BHA 140 may comprise one or more specially made drill collars near the drill bit 142. Each such drill collar may comprise one or more devices permitting measurement of downhole drilling conditions and/or various characteristic properties of the subterranean formation 102 intersected by the wellbore 104. For example, the BHA 140 may comprise one or more logging-while-drilling (LWD) modules 144, one or more measurement-while-drilling (MWD) modules 146, a rotary-steerable system and motor 148, and perhaps the drill bit 142. Other BHA components, modules, and/or tools are also within the scope of the present disclosure, and such other BHA components, modules, and/or tools may be positioned differently in the BHA 140 than as depicted in FIG. 1.

The LWD modules 144 may comprise one or more devices for measuring characteristics of the formation 102, including for obtaining a sample of fluid from the formation 102. The MWD modules 146 may comprise one or more devices for measuring characteristics of the drillstring 112 and/or the drill bit 142, such as for measuring weight-on-bit, torque, vibration, shock, stick slip, tool face direction, and/or inclination, among other examples. The MWD modules 146 may further comprise an apparatus 147 for generating electrical power to be utilized by the downhole system, such as a mud turbine generator powered by the flow of the drilling fluid 126. Other power and/or battery systems may also or instead be employed. One or more of the LWD modules 144 and/or the MWD modules 146 may be or comprise at least a portion of a packer tool as described below.

The wellsite system 100 also includes a data processing system that can include one or more, or portions thereof, of the following: the surface equipment 190, control devices and electronics in one or more modules of the BHA 140 (such as a downhole controller 150), a remote computer system (not shown), communication equipment, and other equipment. The data processing system may include one or more computer systems or devices and/or may be a distributed computer system. For example, collected data or information may be stored, distributed, communicated to a human wellsite operator, and/or processed locally or remotely.

The data processing system may, individually or in combination with other system components, perform the methods and/or processes described below, or portions thereof. Methods and/or processes within the scope of the present disclosure may be implemented by one or more computer programs that run in a processor located, for example, in one or more modules of the BHA 140 and/or the surface equipment 190. Such programs may utilize data received from the BHA 140 via mud-pulse telemetry and/or other telemetry means, and/or may transmit control signals to operative elements of the BHA 140. The programs may be stored on a tangible, non-transitory, computer-usable storage medium associated with the one or more processors of the BHA 140 and/or surface equipment 190, or may be stored on an external, tangible, non-transitory, computer-usable storage medium that is electronically coupled to such processor(s). The storage medium may be one or more known or future-developed storage media, such as a magnetic disk, an optically readable disk, flash memory, or a readable device of another kind, including a remote storage device coupled over a communication link, among other examples.

Figure 2:
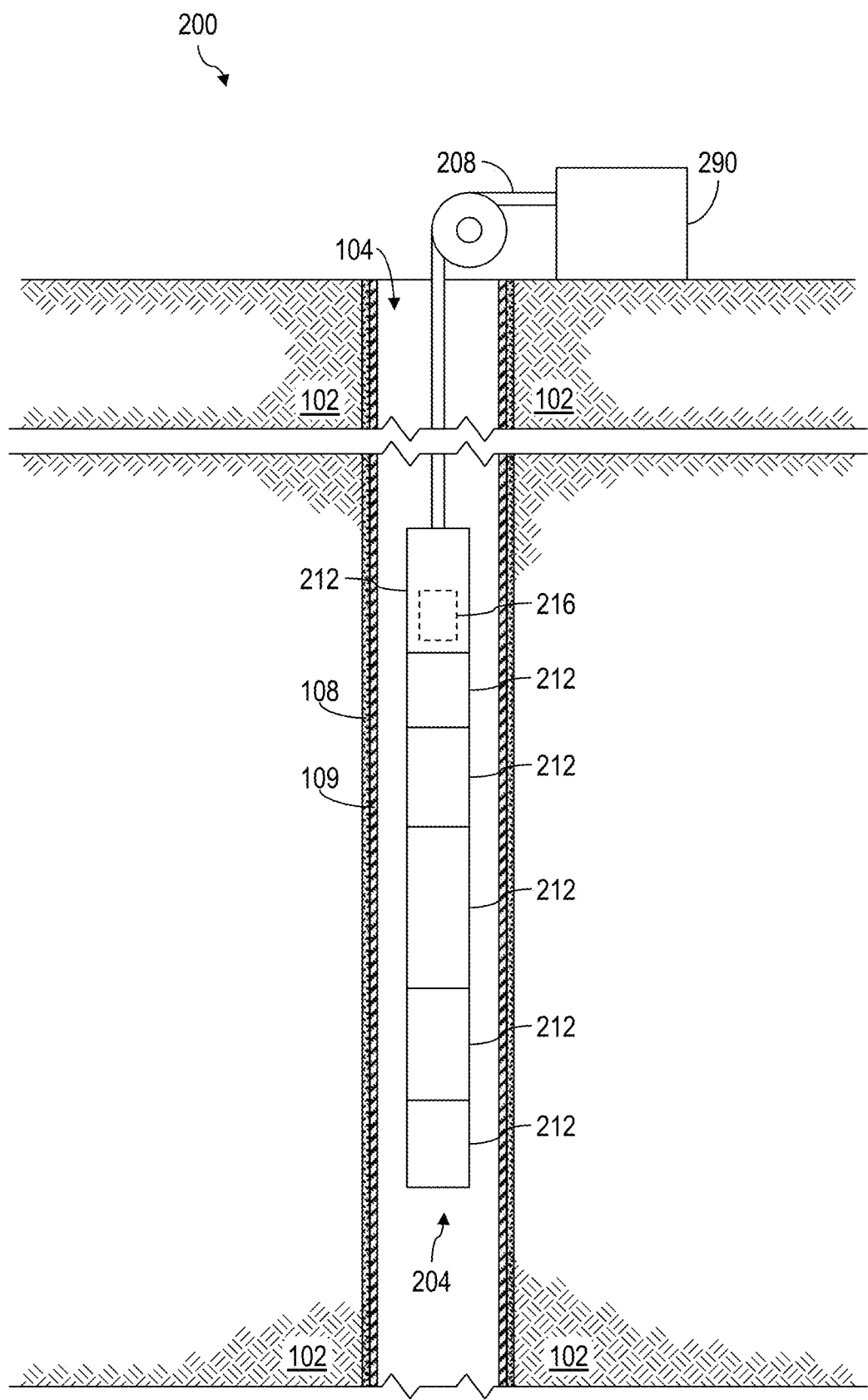
FIG. 2 is a schematic view of at least a portion of an example implementation of apparatus according to one or more aspects of the present disclosure.

FIG. 2 is a schematic view of another example wellsite system 200 to which one or more aspects of the present disclosure may be applicable. The wellsite system 200 may be onshore or offshore. In the example wellsite system 200 shown in FIG. 2, a tool string 204 is conveyed into the wellbore 104 via a wireline and/or other conveyance means 208. As with the wellsite system 100 shown in FIG. 1, the example wellsite system 200 of FIG. 2 may be utilized for evaluation of the wellbore 104, the cement 108 securing the casing 109 within the wellbore 104, and/or the formation 102 penetrated by the wellbore 104.

The tool string 204 is suspended in the wellbore 104 from the lower end of the wireline 208, which may be a multi-conductor logging cable spooled on a winch (not shown). The wireline 208 may include at least one conductor that facilitates data communication between the tool string 204 and surface equipment 290 disposed on the surface. The surface equipment 290 may have one or more aspects in common with the surface equipment 190 shown in FIG. 1.

The tool string 204 and wireline 208 may be structured and arranged with respect to a service vehicle (not shown) at the wellsite. For example, the wireline 208 may be connected to a drum (not shown) at the wellsite surface, permitting rotation of the drum to raise and lower the tool string 204. The drum may be disposed on a service truck or a stationary platform. The service truck or stationary platform may further contain the surface equipment 290.

The tool string 204 comprises one or more elongated housings encasing various electronic components and modules schematically represented in FIG. 2. For example, the illustrated tool string 204 includes several modules 212, at least one of which may be or comprise at least a portion of an acoustic tool as described below. Other implementations of the downhole tool string 204 within the scope of the present disclosure may include additional or fewer components or modules relative to the example implementation depicted in FIG. 2.

The wellsite system 200 also includes a data processing system that can include one or more, or portions thereof, of the following: the surface equipment 290, control devices and electronics in one or more modules of the tool string 204 (such as a downhole controller 216), a remote computer system (not shown), communication equipment, and other equipment. The data processing system may include one or more computer systems or devices and/or may be a distributed computer system. For example, collected data or information may be stored, distributed, communicated to a human wellsite operator, and/or processed locally or remotely.

The data processing system may, individually or in combination with other system components, perform the methods and/or processes described below, or portions thereof. For example, such data processing system may include processor capability for collecting acoustic, ultrasonic, and/or other data related to the evaluation of the cement 108 and/or the formation 102 according to one or more aspects of the present disclosure. Methods and/or processes within the scope of the present disclosure may be implemented by one or more computer programs that run in a processor located, for example, in one or more modules 212 of the tool string 204 and/or the surface equipment 290. Such programs may utilize data received from the downhole controller 216 and/or other modules 212 via the wireline 208, and may transmit control signals to operative elements of the tool string 204. The programs may be stored on a tangible, non-transitory, computer-usable storage medium associated with the one or more processors of the downhole controller 216, other modules 212 of the tool string 204, and/or the surface equipment 290, or may be stored on an external, tangible, non-transitory, computer-usable storage medium that is electronically coupled to such processor(s). The storage medium may be one or more known or future-developed storage media, such as a magnetic disk, an optically readable disk, flash memory, or a readable device of another kind, including a remote storage device coupled over a communication link, among other examples.

While FIGS. 1 and 2 illustrate example wellsite systems 100 and 200, respectively, that convey a downhole tool/string into a wellbore, other example implementations consistent with the scope of this disclosure may utilize other conveyance means to convey a tool into a wellbore, including coiled tubing, tough logging conditions (TLC), slickline, and others. Additionally, other downhole tools within the scope of the present disclosure may comprise components in a non-modular construction also consistent with the scope of this disclosure.

Figure 3:
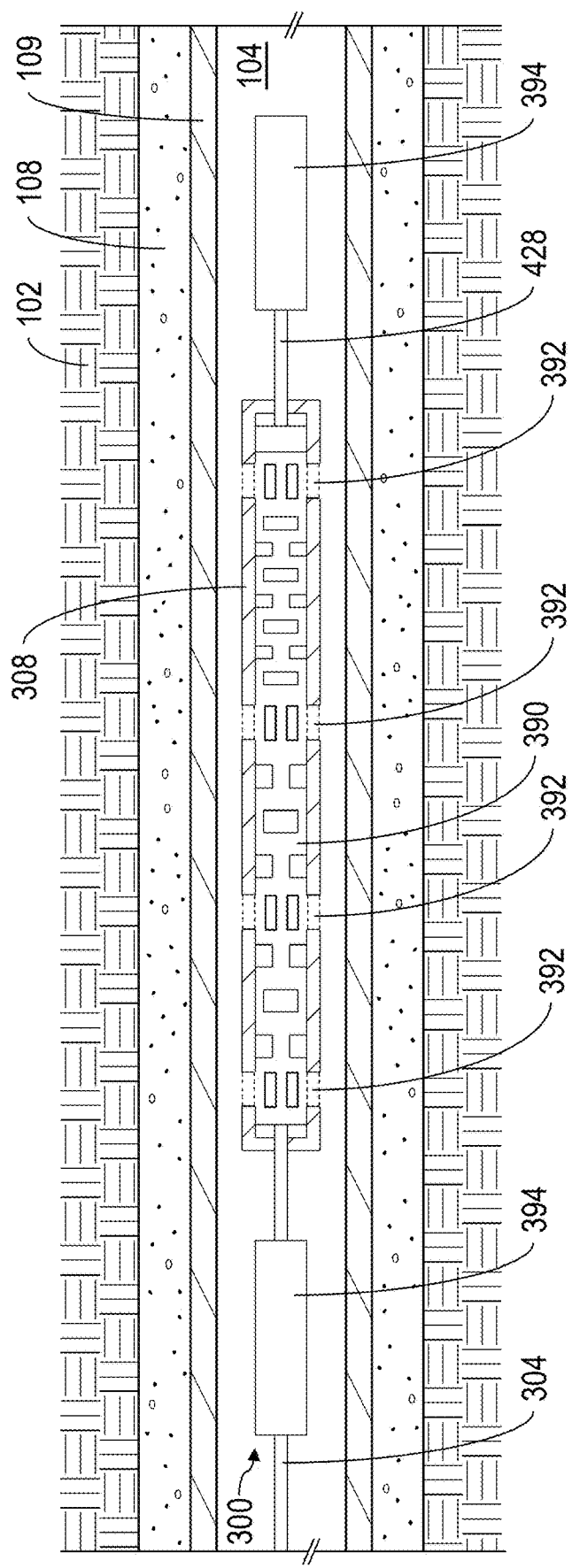
FIG. 3 is a schematic view of a portion of an example implementation of apparatus according to one or more aspects of the present disclosure.

FIG. 3 is a schematic sectional view of at least a portion of an example implementation of an acoustic tool 300 according to one or more aspects of the present disclosure. The acoustic tool 300 may be implemented as one or more of the LWD modules 144 shown in FIG. 1 and/or one or more of the modules 212 shown in FIG. 2, and may thus be conveyed within the wellbore 104 via a drillstring, wireline, and/or other conveyance means 304 schematically depicted in FIG. 3. The acoustic tool 300 may be utilized to evaluate the cement 108 securing the casing 109 within the wellbore 104, and/or to evaluate portions of the formation 102 surrounding the wellbore 104, according to one or more aspects of the present disclosure. In FIG. 3, the acoustic tool 300 is depicted as being disposed in a substantially horizontal portion of the wellbore 104. However, the acoustic tool 300 may also be utilized in other deviated or vertical portions of a wellbore.

The acoustic tool 300 includes a housing (or multiple housings) 308 and/or a hybrid slotted sleeve 390 encasing operational components described below. The housing 308 and/or the slotted sleeve 390 may comprise a plurality of windows 392 or other openings extending around the housing 308 and/or the slotted sleeve 390 at several axial locations along the housing 308 and/or the slotted sleeve 390. The windows 392 may be located around acoustic transmitters and receivers located within the housing 308 and/or the slotted sleeve 390. The acoustic tool 300 also includes cantilevered masses 394 extending from opposing ends of the housing 308.

Figure 4:
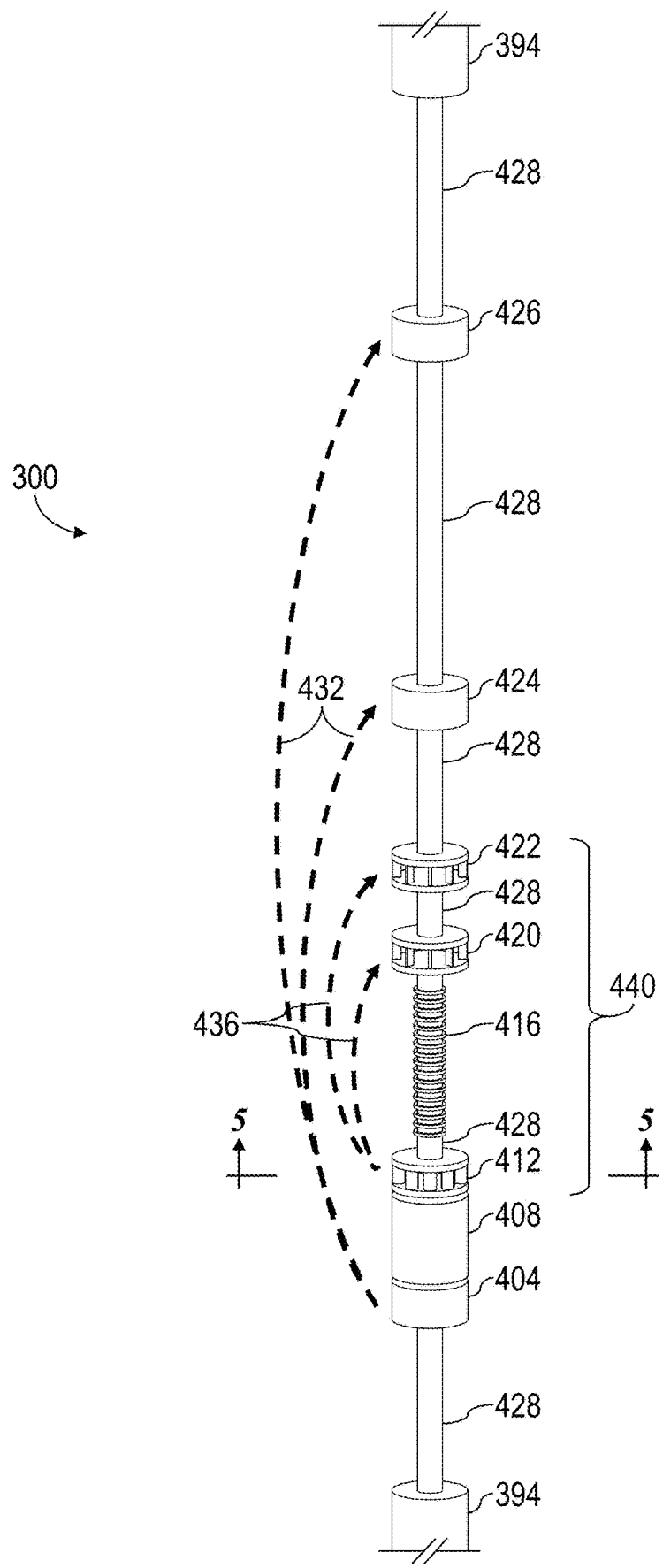
FIG. 4 is a schematic view of a portion of an example implementation of the apparatus shown in FIG. 3.

FIG. 4 is a perspective view of a portion of the acoustic tool 300 having been removed from the wellbore 104, and with the housing 308 and hybrid slotted sleeve 390 removed for clarity. In addition to the cantilevered masses 394 shown in FIG. 3, the acoustic tool 300 may also include one or more of a low-frequency transmitter unit 404, electronics 408, a high-frequency transmitter unit 412, a bellows attenuator 416, one or more high-frequency receiver units 420, 422, and one or more low-frequency receiver units 424, 426, as well as various structural members 428 interconnecting such components.

The electronics 408 may be, comprise, or form at least a portion of the downhole controller 150 shown in FIG. 1 or the downhole controller 216 shown in FIG. 2. The electronics 408 are operable to, for example, cause the transmitter units 404, 412 to emit acoustic signals 432, 436 and detect the acoustic signals 432, 436 with the corresponding receiver units 420, 422, 424, 426, such as for detecting the travel time of the acoustic signals 432, 436 between the transmitter units 404, 412 and the corresponding receiver units 420, 422, 424, 426, as well as amplitudes of the acoustic signals 432, 436 received at the receiver units 420, 422, 424, 426. To increase clarity and aid with understanding, additional features and components of the acoustic tool 300 not relevant to the following description are omitted in the figures, but it is understood that such features and components may exist in various implementations within the scope of the present disclosure. It is also noted that other implementations of an acoustic tool within the scope of the present disclosure may omit one or more of the components depicted in the figures.

Figure 5:
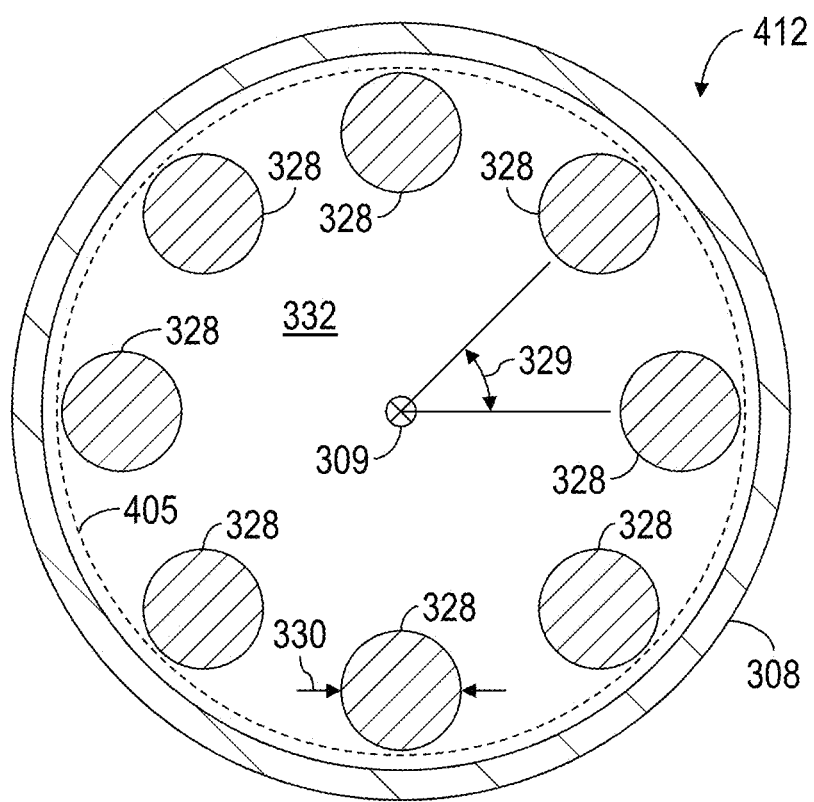
FIG. 5 is a sectional view of a portion of an example implementation of the apparatus shown in FIG. 4.

FIG. 5 is a sectional schematic view of at least a portion of an example implementation of the high-frequency transmitter unit 412. The example high-frequency transmitter unit 412 comprises eight transmitter elements 328 positionally fixed within the housing 308 via an attachment structure 332. The transmitter elements 328 are independently and/or collectively operable to excite acoustic energy to induce monopole, dipole, and other higher order azimuthal modes, depending on which transmitter elements 328 are excited simultaneously and their polarity, to generate acoustic signals 436 as depicted in FIG. 4. In addition, by exciting each transmitter element 328 one-by-one, a unipole excitation may also be achieved. Each transmitter element 328 may comprise a substantially cylindrical portion of piezoelectric ceramic material, such as PCT C-64, and and/or other materials permitting each transmitter element 328 to be independently operated or activated as a point source. The frequency of the acoustic signals 436 generated by the transmitter elements 328 may vary within the scope of the present disclosure, such as between about 20 kHz and about 200 kHz, with an example implementation at a frequency of about 100 kHz.

The transmitter elements 328 are distributed azimuthally around a central axis 309 of the housing 308. The azimuthal spacing 329 between neighboring ones of the transmitter elements 328 may be about 45 degrees. Each transmitter element 328 may have a diameter 330 ranging between about 1.5 centimeters (cm) and about 5 cm, and a height (extending into and out of the page) ranging between about 2.5 cm and about 10 cm. However, other numbers, spacings, and sizes of the transmitter elements 328 are also within the scope of the present disclosure.

The low-frequency transmitter unit 404 may be substantially similar to the high-frequency transmitter unit 412, but is depicted in FIG. 4 as a conventional monopole source. For example, such implementations may comprise a single transmitter, represented in FIG. 5 by a dashed-line circle 405 encompassing the array of smaller transmitter elements 328. Similarly, the low-frequency receivers 424, 426 may also be single element receivers, such as may be conventionally utilized with monopole sources. Implementations within the scope of the present disclosure may also comprise other types and arrangements of acoustic transmitters and receivers, whether instead of or in addition to the example implementations depicted in the figures.

Figure 6:
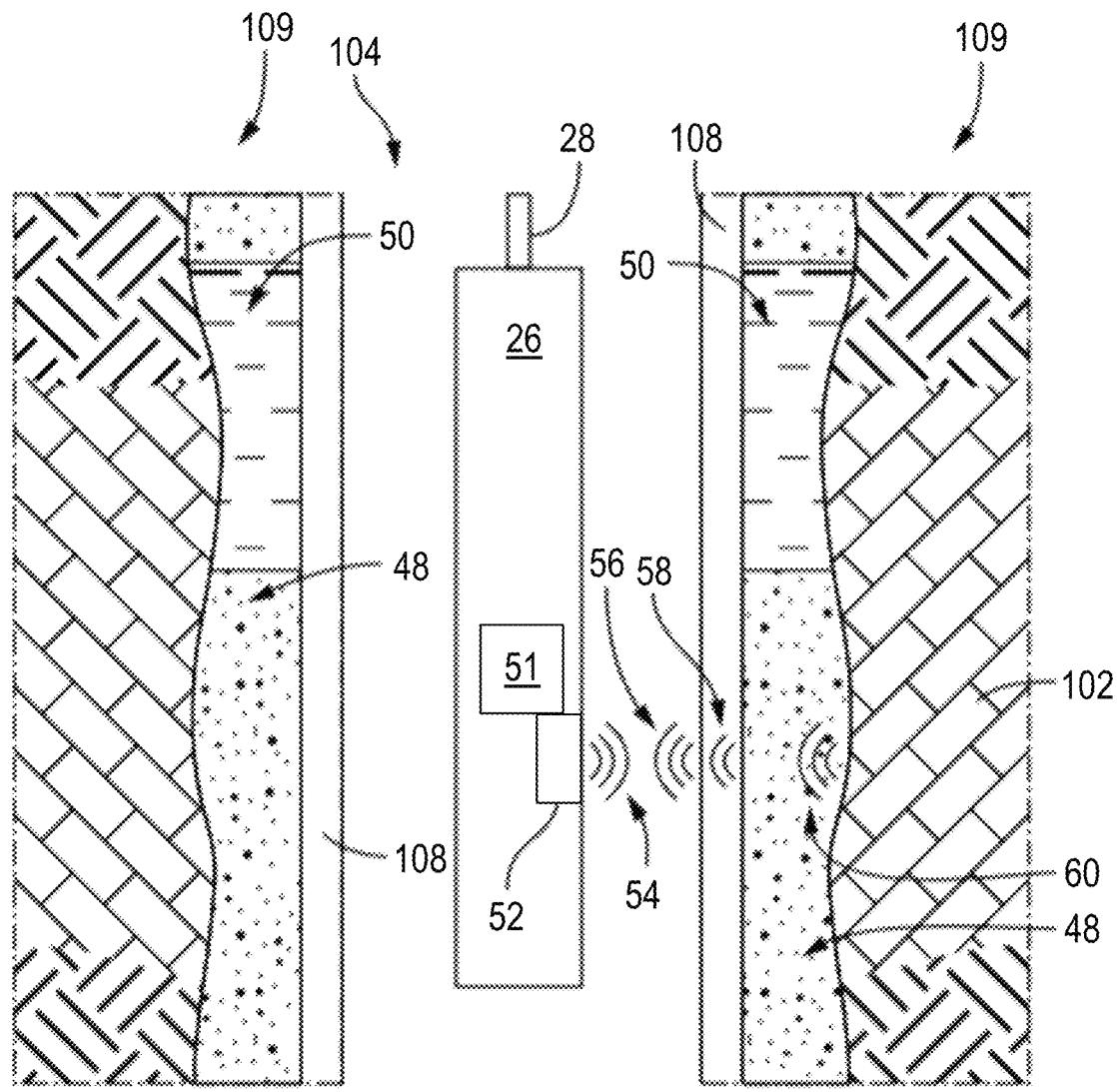
FIG. 6 is a schematic view of at least a portion of an example implementation of apparatus according to one or more aspects of the present disclosure.

Acoustic tools other than the acoustic tool 300 shown in FIGS. 3-5 may also be utilized within the scope of the present disclosure. For example, FIG. 6 is a schematic view of at least a portion of another example implementation of an acoustic tool 26 according to one or more aspects of the present disclosure. The acoustic tool 26 may be utilized in the system 100 shown in FIG. 1 instead of (or in addition to) the acoustic tool 300 shown in FIGS. 3-5, or in the system 200 shown in FIG. 2 instead of (or in addition to) the tool string 204, depending for example on conveyance means 28 utilized for conveying the acoustic tool 26 within the wellbore 104.

A transducer 52 in the acoustic tool 26 may emit acoustic waves 54 toward the casing 108. Reflected waves 56, 58, and 60 may correspond to interfaces at the casing 108, annular fill (e.g., cement) 109, and the geological formation 102 or an outer casing, respectively. The reflected waves 56, 58, and 60 may vary depending on whether the annular fill 109 is of a generally solid character 48 or a generally liquid or gas character 50. The reflected waves 56, 58, and 60 may be received at the same transducer 52 to be processed for evaluation of the annular fill 109 and/or the formation 102. The acoustic tool 26 may use various different techniques, including measurements of acoustic impedance from sonic waves, ultrasonic waves, and/or flexural attenuation. When one or more of these measurements of acoustic evaluation data are obtained, they may be integrated and/or processed to determine characteristics of the annular fill 109. Such processing may be performed by or otherwise in conjunction with the surface equipment (not shown but similar to the surface equipment 190 of FIG. 1 and/or the surface equipment 290 of FIG. 2), a downhole controller 51, and/or other processing equipment.

Figure 7:
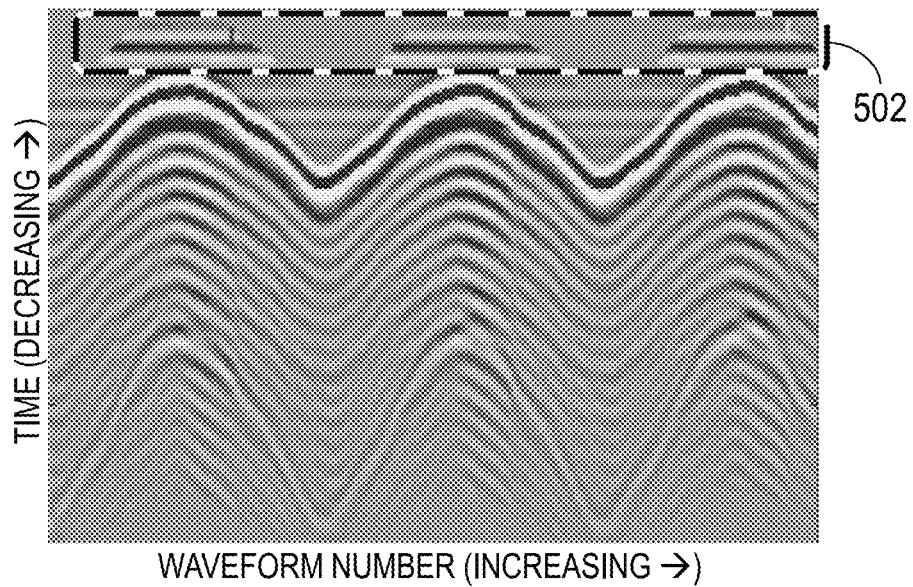
FIGS. 7 and 8 are example waveform plots pertaining to one or more aspects of the present disclosure.

FIG. 7 depicts example waveforms obtained utilizing a downhole pulse-echo measurement tool, such as an implementation of the apparatus as described above. However, as described above, one or more aspects of the present disclosure are applicable or readily adaptable for use with other types of acoustic measurements. The following description is presented in the context of use with pulse-echo measurements for the sake of clarity and ease of understanding.

Figure 8:
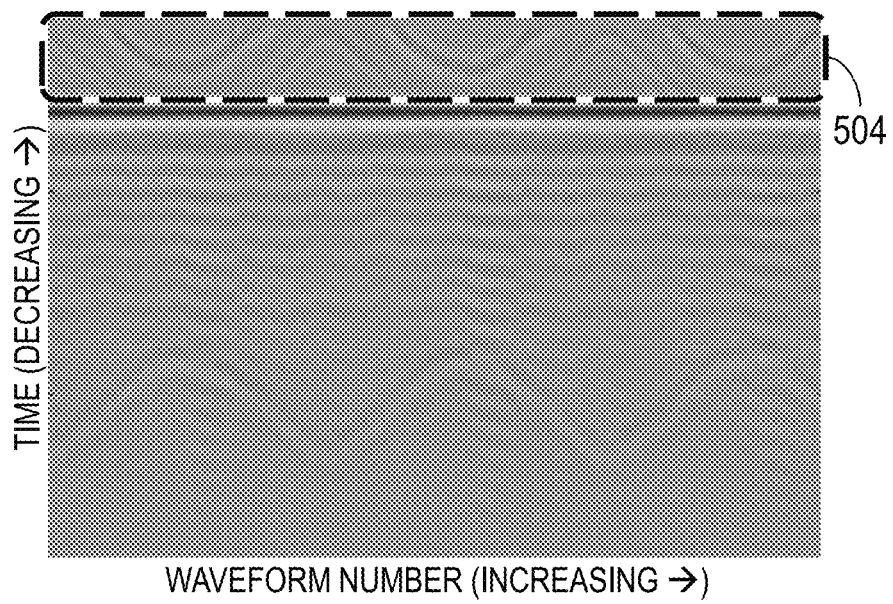

In FIG. 7, the x-axis represents the succession of measured waveforms, the y-axis represents time, and the waveform amplitudes are color-coded from lighter (greater positive amplitude) to darker (greater negative amplitude). Each waveform is aligned in time with a constant delay relative to the firing pulse. That is, the waveforms are aligned such that their respective firing pulses are at the same location in time. FIG. 8 depicts the same waveforms, but with the waveforms aligned relative to the main echo of the reflected signal. That is, the waveforms are aligned such that their respective main echo is at the same location in time.

Figure 9:
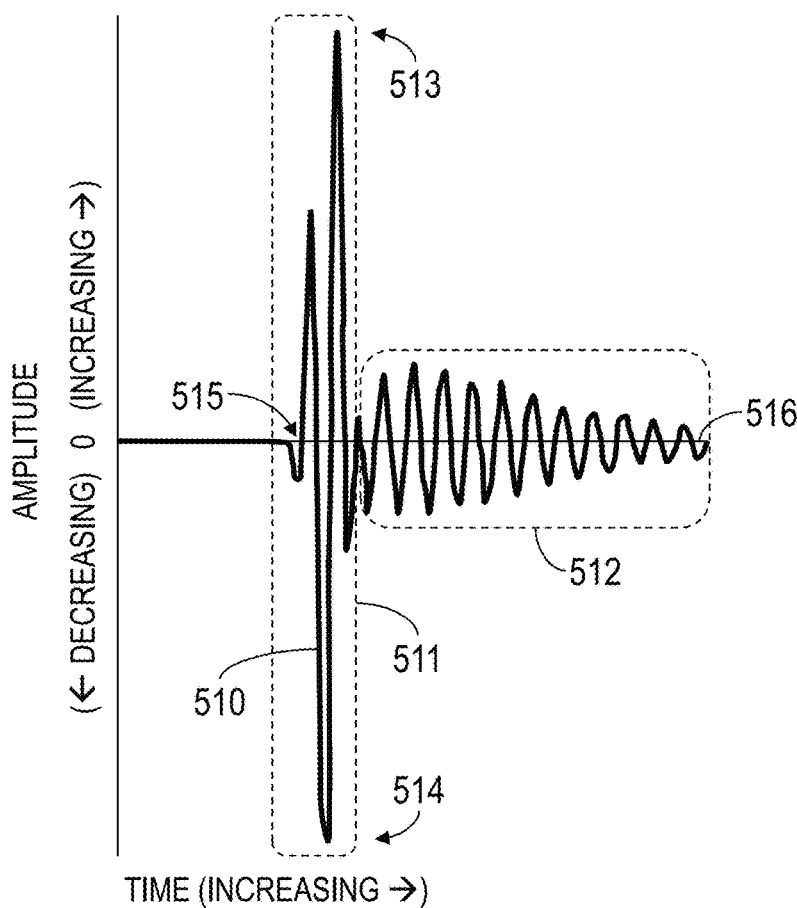
FIG. 9 is a graph depicting an example waveform.

For example, FIG. 9 depicts a reflected waveform 510 represented as amplitude as a function of time. The waveform 510 is an example of each reflected waveform received in response to a firing pulse, which are collectively represented in FIGS. 7 and 8. As shown in FIG. 9, each waveform 510 generally includes two parts, a main echo pulse 511 having a higher amplitude, and a resonant tail 512 of lower amplitude. Aligning the reflected waveforms relative to the main echo 511, as depicted in FIG. 8, may comprise aligning at the same location in time a remarkable point of the main echo 511, such as a point of highest amplitude 513, a first extremum 514, or a first intersection 515 with the zero-amplitude axis 516.

Figure 10:
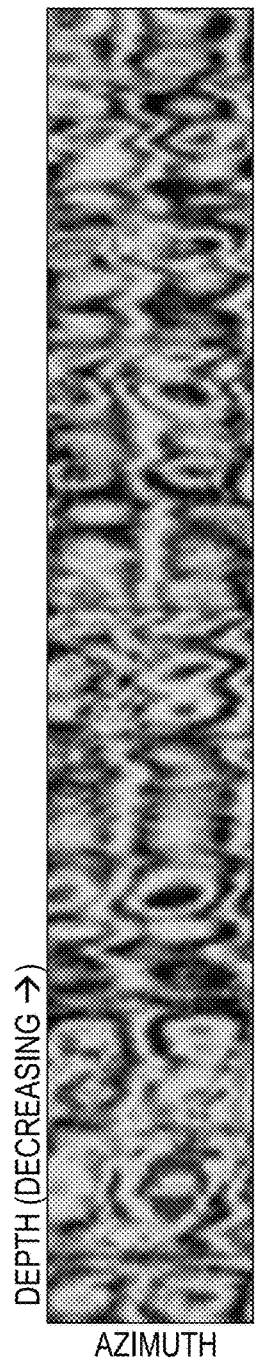
FIG. 10 is an example imaging log pertaining to one or more aspects of the present disclosure.

In FIG. 9, the noise that is represented in tool noise. By aligning the waveforms relative to firing pulse, as shown in FIG. 7, the synchronous nature of such noise is revealed, and the tool noise 502 is exhibited as coherent stripes, indicating that the noise is synchronized with the firing pulse. The coherent nature of the noise is shown by the fact that it is possible to align the waveforms generated by this noise for each measured waveforms. However, by aligning the waveforms relative to the main echo, as shown in FIG. 8, the tool noise 504 is exhibited by sinusoidal waves. This is because, as explained earlier, the tool noise is non-coherent relative to the main echo. As shown in FIGS. 7 and 8, it is quite easy to determine the noise shape coming before the main echo pulse, but it is a challenging task to do so for the noise that intersects with the received signal. The following description presents one or more aspects pertaining to extracting this noise using the non-coherence of the signal arrival time with respect to firing pulse (ie non-coherence of the tool noise relative to the main echo). If the noise is not removed, the pulse-echo log appears polluted by the tool noise (as depicted by the elliptical features depicted in the example log shown in FIG. 10), making the final analysis unreliable. As indicated earlier, such method can also be adapted to be applied to other types of noise as will be described in more details hereinafter.

Figure 11:
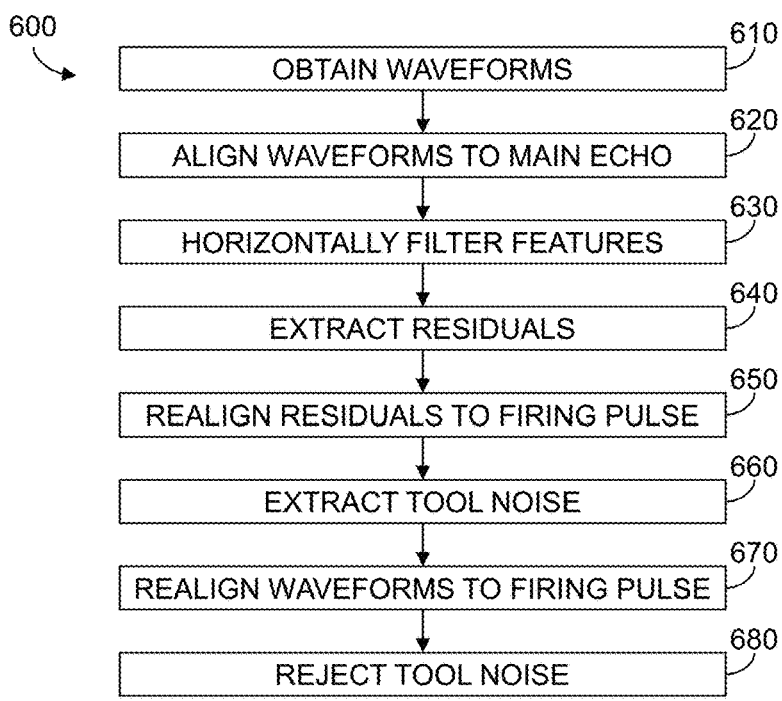
FIG. 11 is a flow-chart diagram of at least a portion of an example implementation of a method according to one or more aspects of the present disclosure.

FIG. 11 is a flow-chart diagram of at least a portion of an example implementation of a method 600 for such tool noise extraction according to one or more aspects of the present disclosure. The method 600 may be utilized in conjunction with, and/or at least partially performed by, the apparatus described herein. For example, the controller 150 and/or surface equipment 190 shown in FIG. 1, the controller 216 and/or surface equipment 290 shown in FIG. 2, the electronics 408 shown in FIG. 4, and/or at least a portion of one or more instances of the processing system 900 shown in FIG. 24 (described below) may be utilized to perform at least a portion of the method 600.

Figure 12:
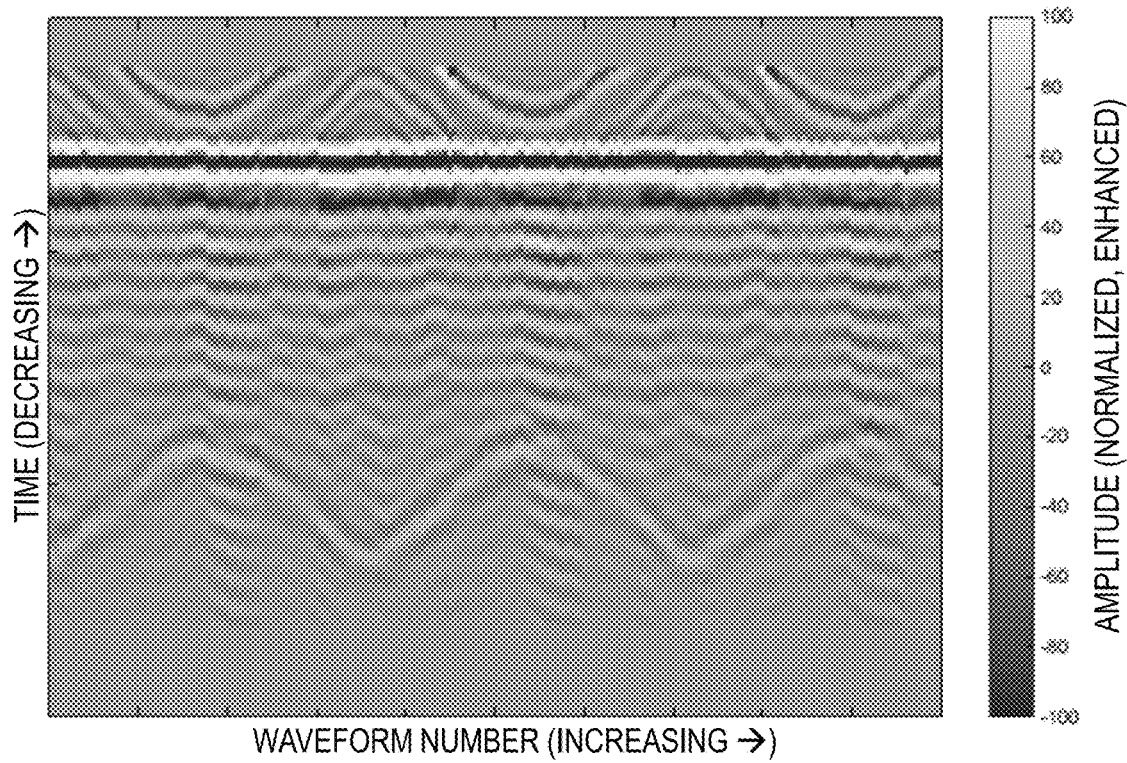
FIGS. 12-19 are example waveform plots pertaining to one or more aspects of the present disclosure.

The method 600 may include obtaining 610 the waveforms to be processed. For example, the apparatus depicted in one or more of FIGS. 1-6 and 24 may be utilized to obtain 610 the waveforms. An example of the obtained 610 waveforms is depicted in FIG. 12, in which the x-axis represents the succession of obtained 610 waveforms, the y-axis represents time, and the waveform amplitudes are color-coded from lighter (greater positive amplitude) to darker (greater negative amplitude). The obtained 610 waveforms are depicted in FIG. 12 in initial time-of-arrival order as obtained from the tool. It can be seen that even if the main echo pulse of the different waveforms are generally synchronous in time, there is a certain jitter of the signal depending of the waveform number.

Figure 13:
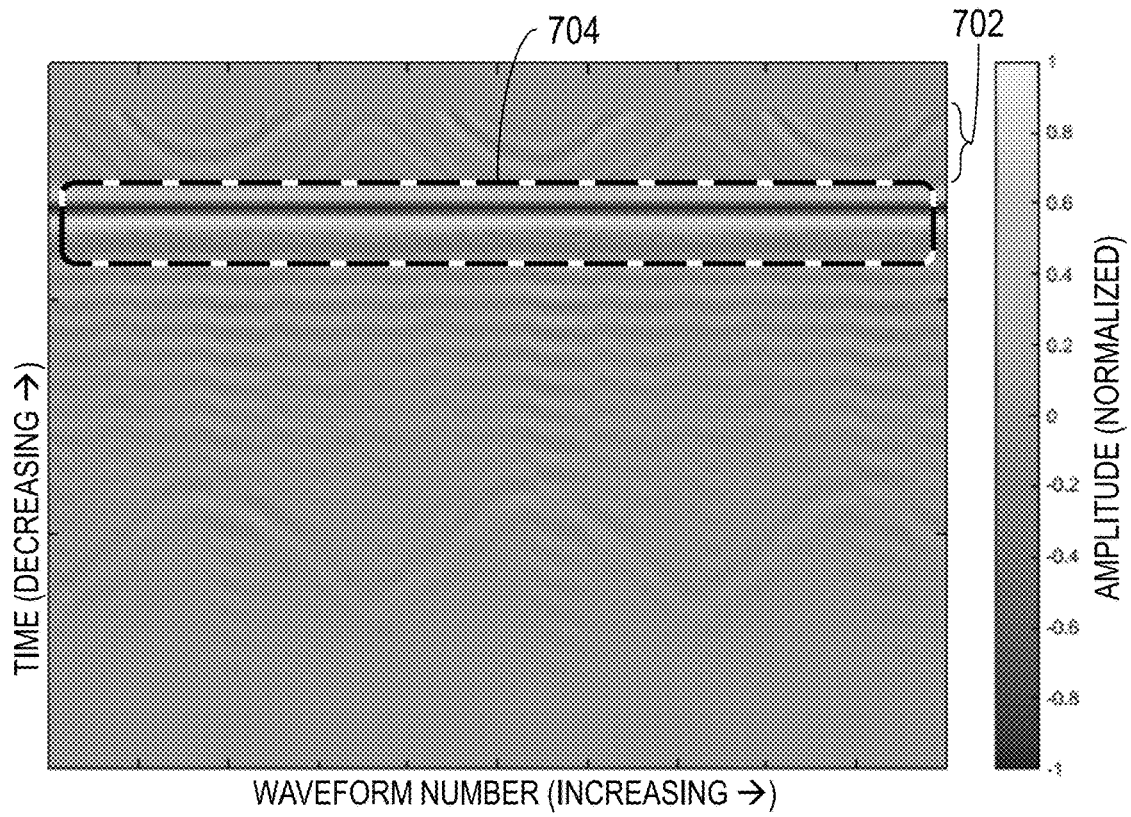

The method 600 includes aligning 620 the obtained 610 waveforms relative to the main echo 702, such as via signal processing performed by processing means of the acoustic tool and/or surface equipment. The waveforms are then fine-aligned, using for instance Fourier phase properties. The amplitude of the main echo may be normalized to have the same maximum value for each waveform. Example results of such "echo-alignment" 620 are depicted in FIG. 13, in which the tool noise 702 is visible as sine-like waves above the main echo 704. It can be seen on this FIG. 13 that the jitter of the time-of-arrival mode shown on FIG. 12 is therefore eliminated, and the main echo pulse is shown as a straight line on the FIG. 13 plot after alignment.

Figure 14:
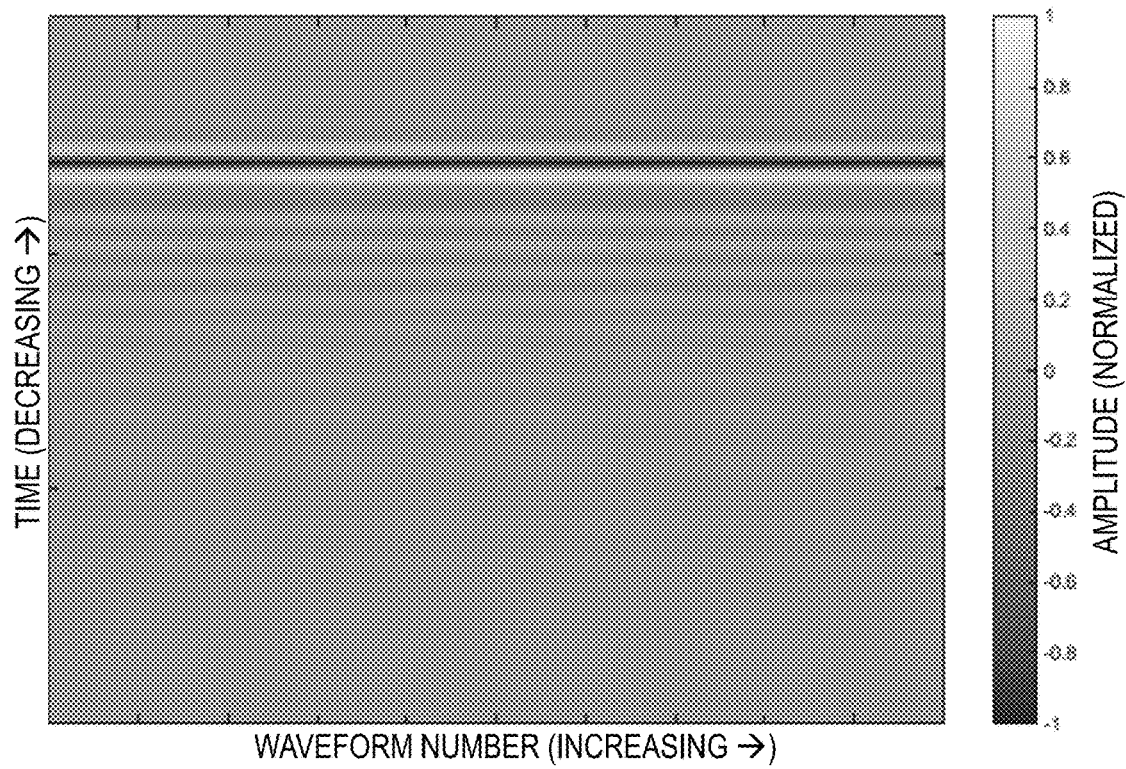

The echo-aligned 620 waveforms are then subjected to filtering 630, as depicted in the example results shown in FIG. 14. The filtering 630 may be referred to as low-pass filtering, which removes quickly-varying, non-horizontal features. Such filtering 630 is at least strong enough to remove the tool noise. For example, if sliding-window averaging is utilized, the window size may be longer than the period of the noise cycle. Chunk-wise averaging may also be utilized by averaging the waveforms in each chunk, with each chunk being larger than the period of the noise cycle. However, the filtering 630 may utilize other types of waveform-averaging and/or other processes for removing the tool noise.

Figure 15:
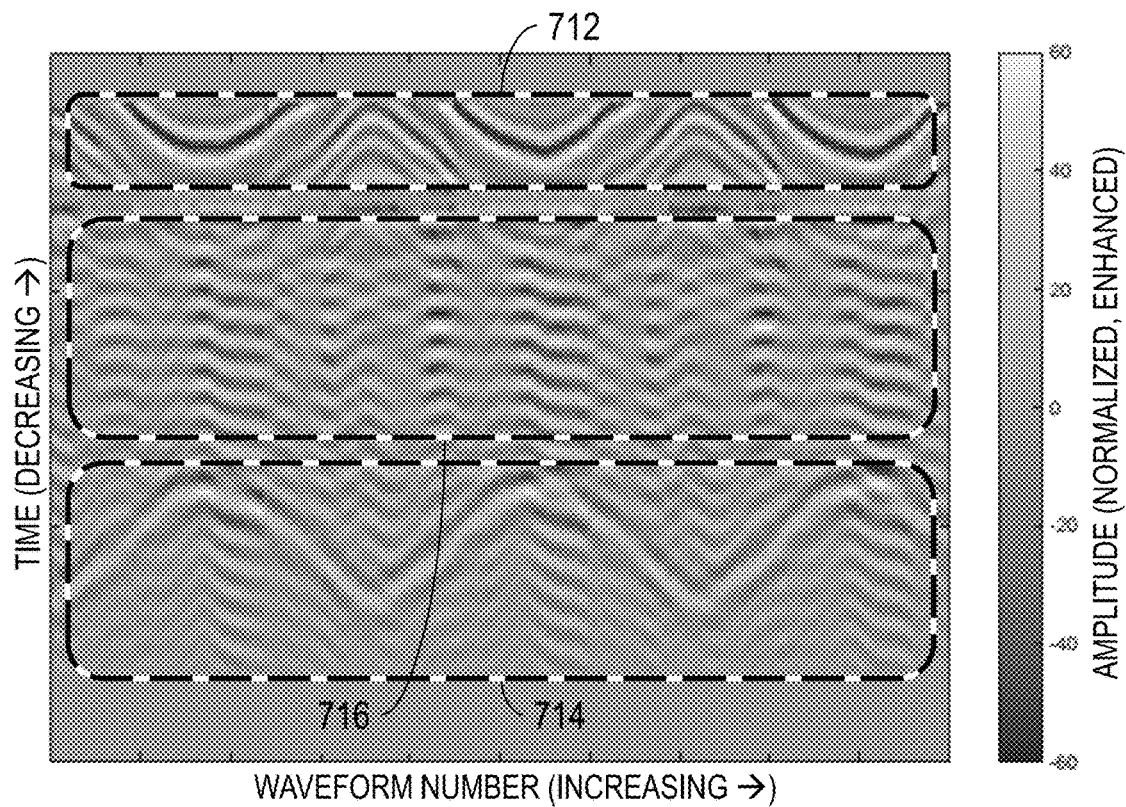

The differences between the aligned 620 waveforms (FIG. 13) and the filtered 630 waveforms (FIG. 14) are then extracted 640 as residuals. Example results of such residual extraction 640 are depicted in FIG. 15. The residual extraction 640 distinguishes at least three types of patterns, including sine-like structures 712 at early times, sine-like structures 714 at later times, and waveform residuals 716 at intermediate times. The waveform residuals 716 result from the difference between the low-pass filtered waveform and the actual individual waveform from each wave-sample. The waveform residuals 716 do not have a regular structure, because they depend on thickness variation and acoustic impedance variation of the wellbore and annulus media. These parameters generally do not correlate with the tool synchronization signals.

Figure 16:
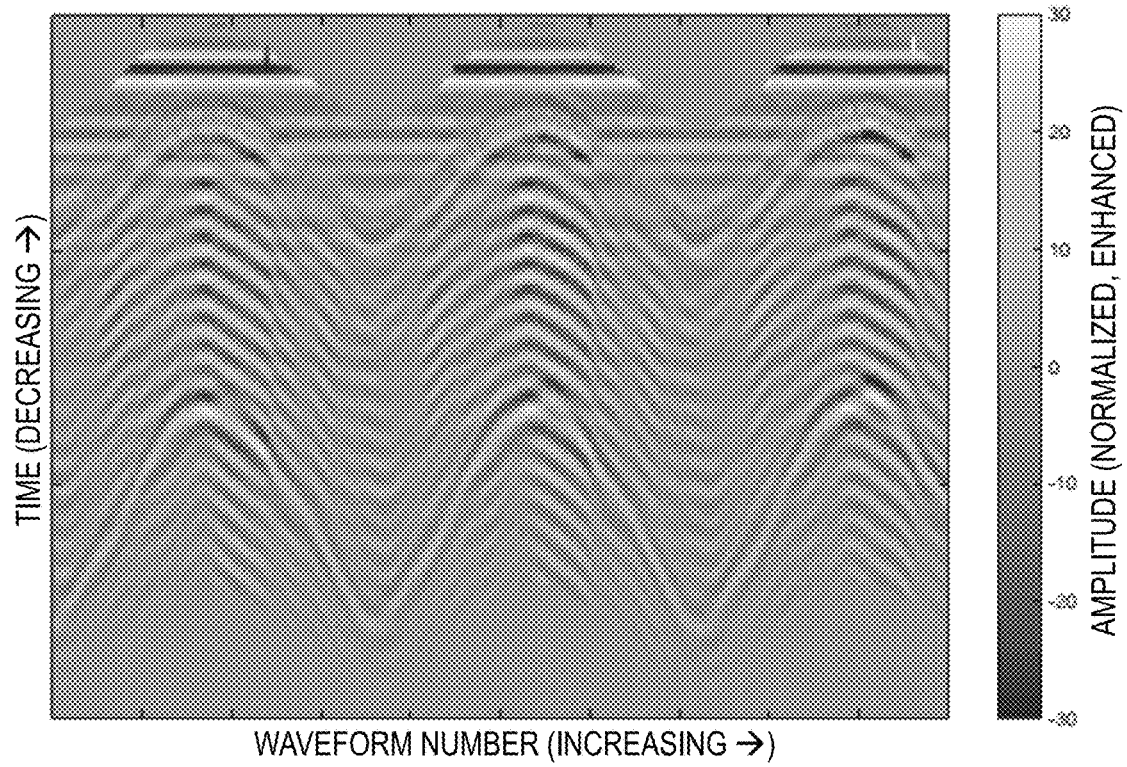

The extracted 640 residuals are then realigned 650 with respect to firing pulse of the tool, that is a characteristic time relative to the tool noise, ie the noise front. As depicted in the example results shown in FIG. 16, the tool noise is represented by horizontal stripes, because it is synchronized to the firing pulse.

Figure 17:
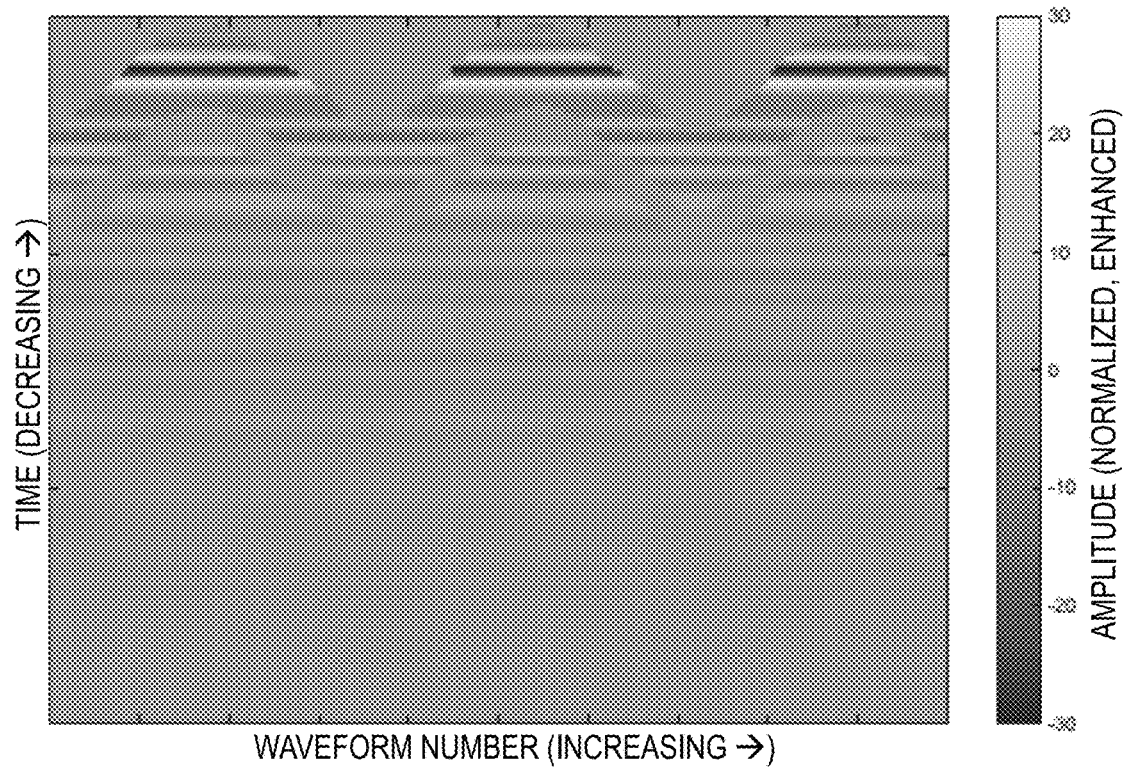

As depicted in FIG. 17, the tool noise is then extracted 660 from the realigned 650 residuals by applying another horizontal, low-pass filter, which may be similar in concept to the horizontal, low-pass filtering 630 examples described above, but perhaps with different parameters. For example, a simple sliding average or other alternatives may be utilized for such extraction 660. To ensure such filtering is strong enough to filter the residuals, if a simple sliding average is utilized, a window of a length about 100 waveforms may be utilized.

Figure 18:
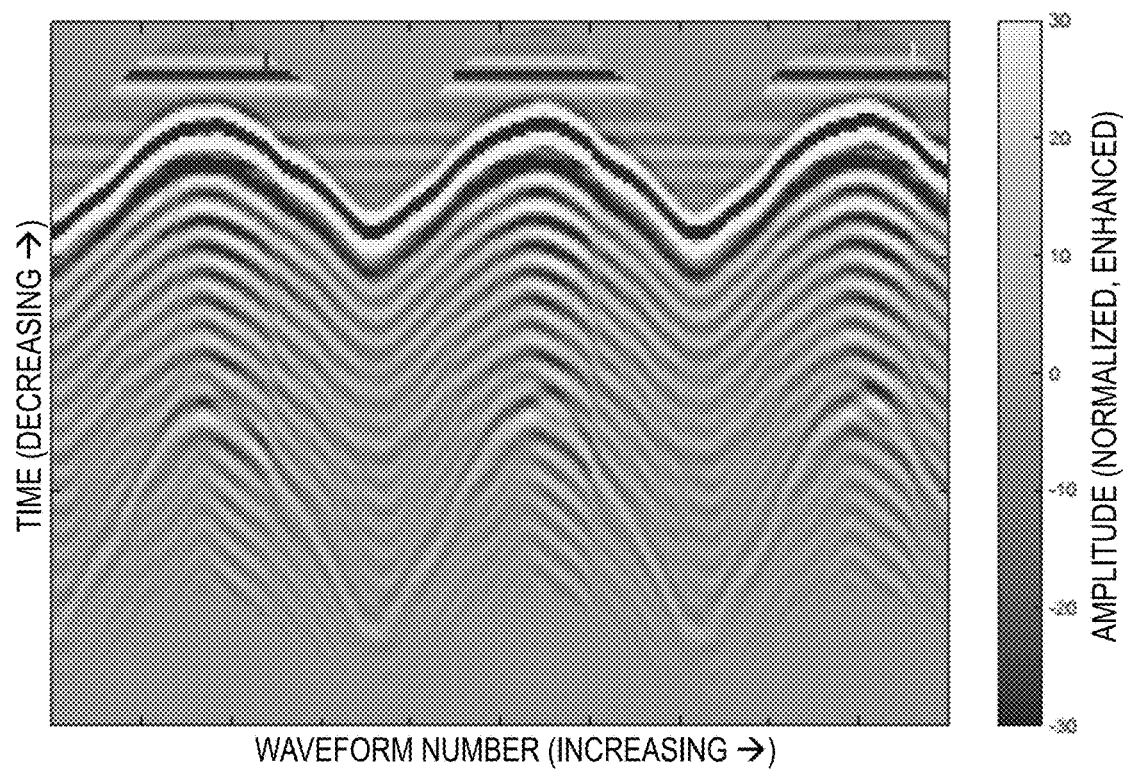
Figure 19:
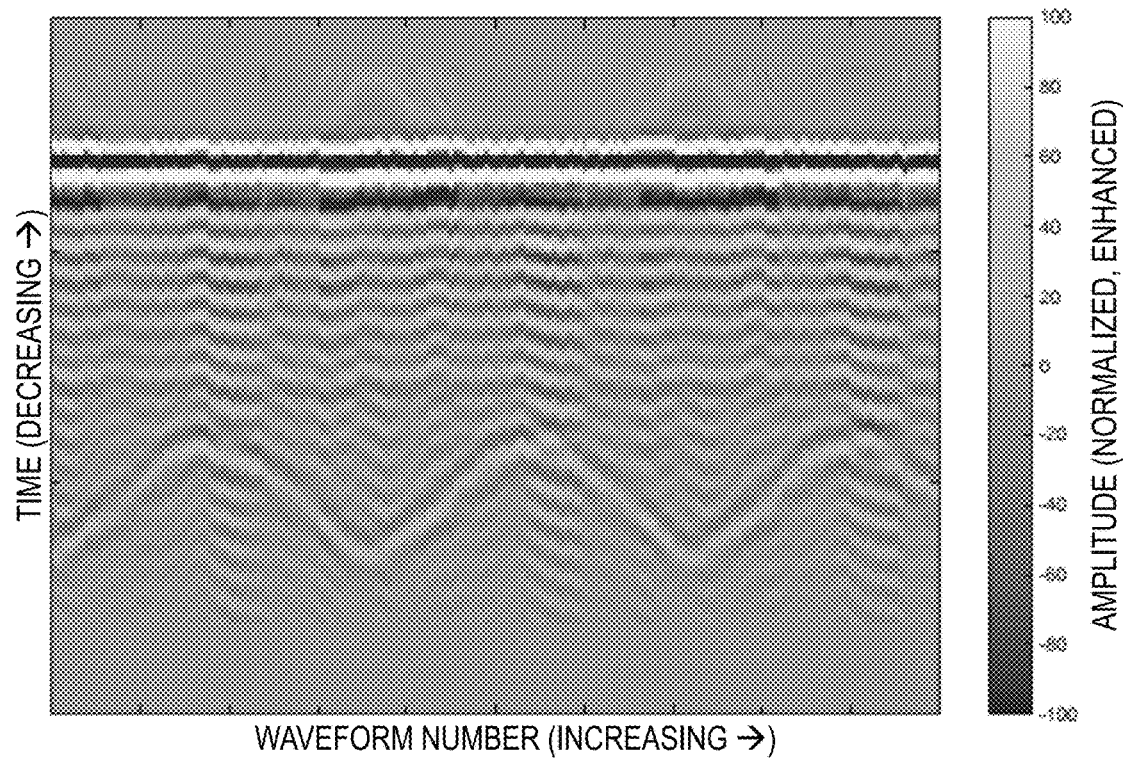

The initially obtained 610 waveforms are then realigned 670 with respect to firing pulse, as depicted in FIG. 18. The tool noise is then rejected 680 by subtracting the extracted 660 noise from the realigned 670 waveforms and then realigning the result to the initial time-of-arrival order, as depicted in FIG. 19.

FIGS. 20-23 depict example results obtained utilizing the method 600. In FIG. 20, the initial log 740 is strongly affected by tool noise, resulting in numerous structures resembling the markings of a cheetah. After performing noise rejection according to one or more aspects of the present disclosure, the log 742 is more interpretable, and clear liquid pockets are visible.

In FIG. 21, the tool noise does not strongly affect the top part of the initial log 750, but the bottom is more affected because, with stronger attenuation, less signal gets back to the transducer. As seen in the noise-reduced log 752, a substantial portion of the initially noisy bottom part becomes interpretable. This is due to improved signal-to-noise ratio obtained by performing the noise rejection.

In FIG. 22, the initial log 760 is not interpretable. The noise-reduced log 762, however, shows a much cleaner, quality output.

In FIG. 23, the initial log 770 includes an artificial horizontal pattern that does not appear in the noise-reduced log 772. Moreover, a channel 774 was known to exist, as a result of other independent measurements, and the channel 774 remains present on the cleaned log 772. Thus, FIG. 23 demonstrates that the noise-reduction introduced in the present disclosure can be utilized without the risk of removing data indicative of actual downhole features.

Figure 24:
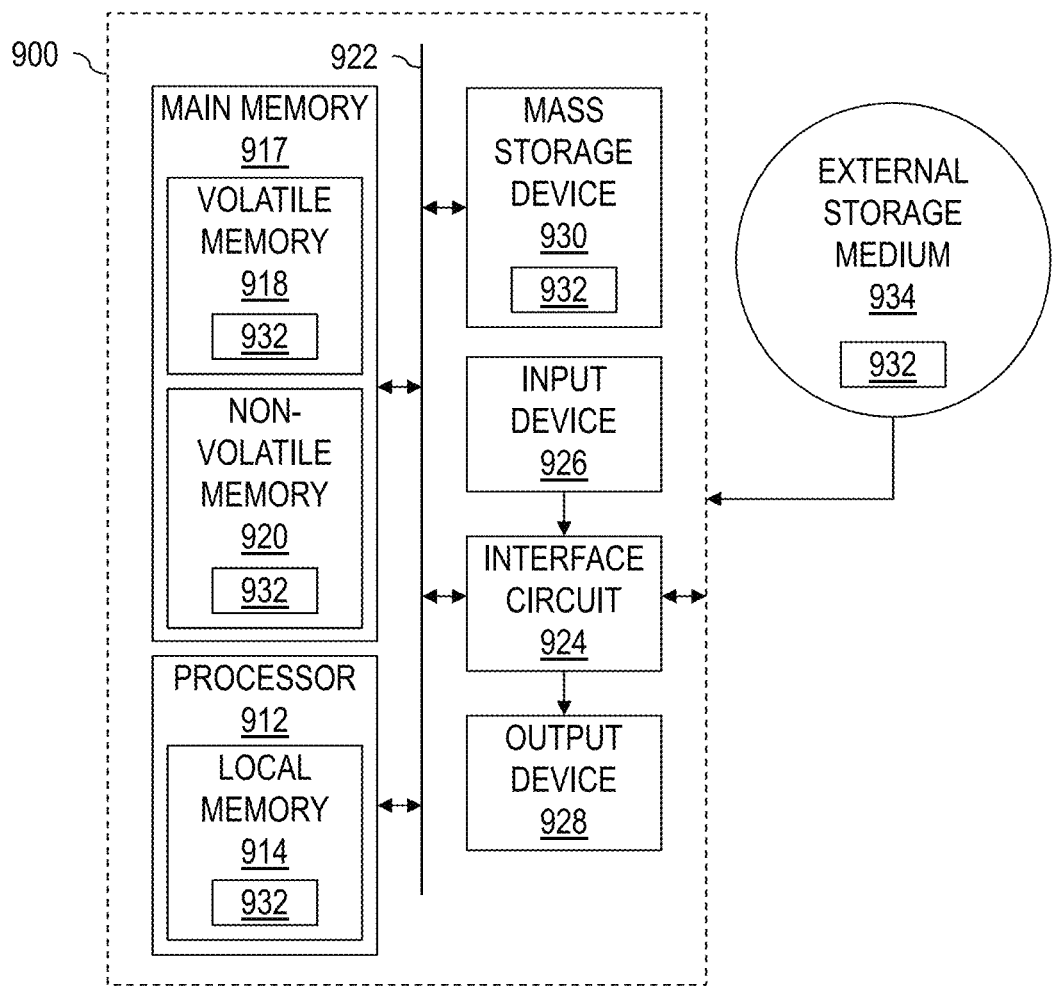
FIG. 24 is a schematic view of at least a portion of an example implementation of apparatus according to one or more aspects of the present disclosure.
Figure 25:
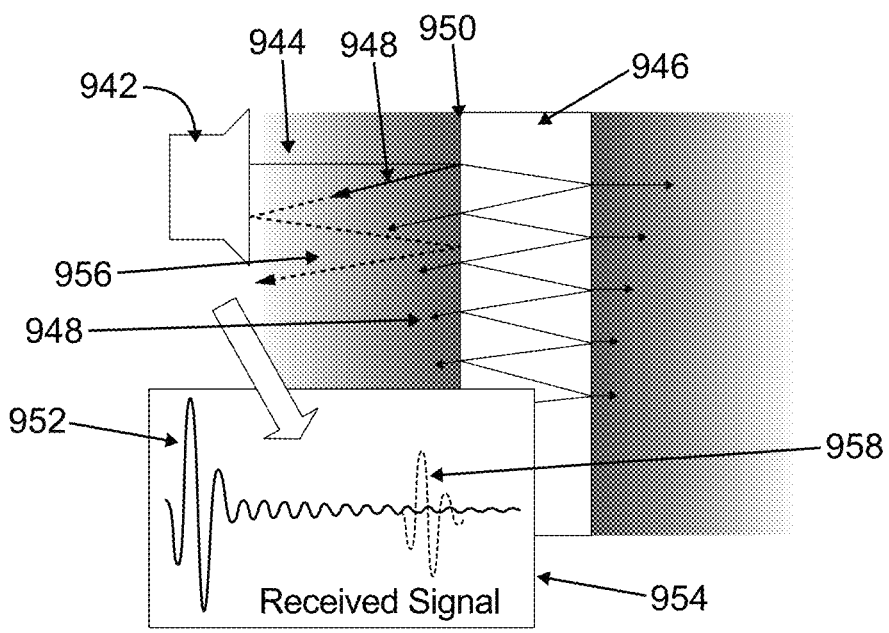
FIG. 25 is a schematic view of interactions between a transducer and a casing in a wellbore.

FIG. 24 is a schematic view of at least a portion of an example implementation of a processing system 900 according to one or more aspects of the present disclosure. The processing system 900 may execute example machine-readable instructions to implement at least a portion of one or more of the methods and/or processes described herein, and/or to implement a portion of one or more of the example downhole tools described herein. The processing system 900 may be or comprise, for example, one or more processors, controllers, special-purpose computing devices, servers, personal computers, personal digital assistant (PDA) devices, smartphones, internet appliances, and/or other types of computing devices. The entirety of the processing system 900 may be implemented within downhole apparatus described above. One or more components or functions of the processing system 900 may also or instead be implemented in wellsite surface equipment, perhaps including the surface equipment 190 depicted in FIG. 1, the surface equipment 290 depicted in FIG. 2, and/or other surface equipment.

The processing system 900 may comprise a processor 912, such as a general-purpose programmable processor, for example. The processor 912 may comprise a local memory 914, and may execute program code instructions 932 present in the local memory 914 and/or another memory device. The processor 912 may execute, among other things, machine-readable instructions or programs to implement the methods and/or processes described herein. The programs stored in the local memory 914 may include program instructions or computer program code that, when executed by an associated processor, cause a controller and/or control system implemented in surface equipment and/or a downhole tool to perform tasks as described herein. The processor 912 may be, comprise, or be implemented by one or more processors of various types operable in the local application environment, and may include one or more general-purpose processors, special-purpose processors, microprocessors, digital signal processors (DSPs), field-programmable gate arrays (FPGAs), application-specific integrated circuits (ASICs), processors based on a multi-core processor architecture, and/or other processors.

The processor 912 may be in communication with a main memory 917, such as via a bus 922 and/or other communication means. The main memory 917 may comprise a volatile memory 918 and a non-volatile memory 920. The volatile memory 918 may be, comprise, or be implemented by random access memory (RAM), static random access memory (SRAM), synchronous dynamic random access memory (SDRAM), dynamic random access memory (DRAM), RAMBUS dynamic random access memory (RDRAM), and/or other types of random access memory devices. The non-volatile memory 920 may be, comprise, or be implemented by read-only memory, flash memory, and/or other types of memory devices. One or more memory controllers (not shown) may control access to the volatile memory 918 and/or the non-volatile memory 920.

The processing system 900 may also comprise an interface circuit 924. The interface circuit 924 may be, comprise, or be implemented by various types of standard interfaces, such as an Ethernet interface, a universal serial bus (USB), a third generation input/output (3GIO) interface, a wireless interface, and/or a cellular interface, among other examples. The interface circuit 924 may also comprise a graphics driver card. The interface circuit 924 may also comprise a communication device, such as a modem or network interface card, to facilitate exchange of data with external computing devices via a network, such as via Ethernet connection, digital subscriber line (DSL), telephone line, coaxial cable, cellular telephone system, and/or satellite, among other examples.

One or more input devices 926 may be connected to the interface circuit 924. One or more of the input devices 926 may permit a user to enter data and/or commands for utilization by the processor 912. Each input device 926 may be, comprise, or be implemented by a keyboard, a mouse, a touchscreen, a track-pad, a trackball, an image/code scanner, and/or a voice recognition system, among other examples.

One or more output devices 928 may also be connected to the interface circuit 924. One or more of the output devices 928 may be, comprise, or be implemented by a display device, such as a liquid crystal display (LCD), a light-emitting diode (LED) display, and/or a cathode ray tube (CRT) display, among other examples. One or more of the output devices 928 may also or instead be, comprise, or be implemented by a printer, speaker, and/or other examples.

The processing system 900 may also comprise a mass storage device 930 for storing machine-readable instructions and data. The mass storage device 930 may be connected to the interface circuit 924, such as via the bus 922. The mass storage device 930 may be or comprise a floppy disk drive, a hard disk drive, a compact disk (CD) drive, and/or digital versatile disk (DVD) drive, among other examples. The program code instructions 932 may be stored in the mass storage device 930, the volatile memory 918, the non-volatile memory 920, the local memory 914, and/or on a removable storage medium 934, such as a CD or DVD.

The mass storage device 930, the volatile memory 918, the non-volatile memory 920, the local memory 914, and/or the removable storage medium 934 may each be a tangible, non-transitory storage medium. The modules and/or other components of the processing system 900 may be implemented in accordance with hardware (such as in one or more integrated circuit chips, such as an ASIC), or may be implemented as software or firmware for execution by a processor. In the case of firmware or software, the implementation can be provided as a computer program product including a computer readable medium or storage structure containing computer program code (i.e., software or firmware) for execution by the processor.

Another embodiment of a method according to the disclosure is described in relationship with FIGS. 25 to 34 in order to correct for another type of noise, ie the specular echo signal, that is a standoff-dependent artifact.

The second specular echo is a coherent noise that appears in the measured waveforms when the tool is situated too close to the walls of the casing that is evaluated. In this case, the echo resulting from double bouncing between the wall and transducer interferes in the resonance echo that bears the main information and from which the parameters of interest are derived. This feature limits or corrupts the interpretation. This is shown on FIG. 25 wherein the transducer 942 emits a pulse 944 towards the casing 946. The emitted pulse travels in the casing and reflects a portion of the signal 948 towards the transducer when encountering the interface 950 of the casing. The reflection with the interface of the casing result in the signals 952 received at the transducer and shown in full line on the plot 954. However, after having received the main echo, the signal rebounds on the transducer as shown in dotted line at 956. This signal is also reflected at the casing interface 950 resulting at the second specular echo signal 958 shown in dotted line on the plot 954.

Figure 26:
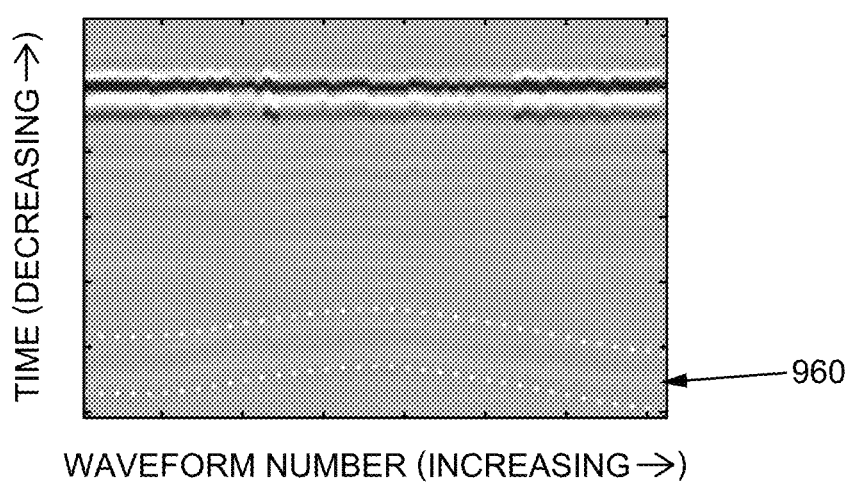
FIG. 26 is an example waveform plot pertaining to one or more aspects of the present disclosure.

FIG. 26 depicts example waveforms obtained utilizing a downhole pulse-echo measurement tool, such as an implementation of the apparatus as described above and showing a second specular echo. However, as described above, one or more aspects of the present disclosure are applicable or readily adaptable for use with other types of acoustic measurements. The following description is presented in the context of use with pulse-echo measurements for the sake of clarity and ease of understanding. As in FIG. 7, the x-axis represents the succession of measured waveforms, the y-axis represents time, and the waveform amplitudes are color-coded from lighter (greater positive amplitude) to darker (greater negative amplitude).

The waveforms in FIG. 26 are represented in initial time-of-arrival order as obtained from the tool. It can be seen that even if the main echo 970 of the different waveforms are generally synchronous in time, there is a certain jitter of the signal depending of the waveform number. The stacked waveforms that are used for the workflow in the present disclosure may be the waveforms taken at one particular depths or at a plurality of depths. The workflow might be executed sequentially depth-wise with sliding averages over several tens of hundreds of depths. On FIG. 26, the second specular echo is outlined in zone 960 between the dotted lines. Whereas the main echo of the waveforms in the time-of-arrival configuration are represented are horizontal stripes (as they are roughly aligned, with the above-mentioned jitter), it can be seen that the second specular echo has a sinusoidal shape. Indeed, the second specular echo is non-coherent relative to the main echo as it arrives later relative to main echo when the tool is further from the casing. The second specular echo can be discriminated from the main echo and resonant tail using this property. The following description presents one or more aspects pertaining to extracting the noise due to second specular echo using the non-coherence of the signal arrival time with respect to main echo. If the noise is not removed, the pulse-echo log appears polluted by the tool noise (as shown previously in relationship with the tool noise) making the final analysis unreliable.

Figure 27:
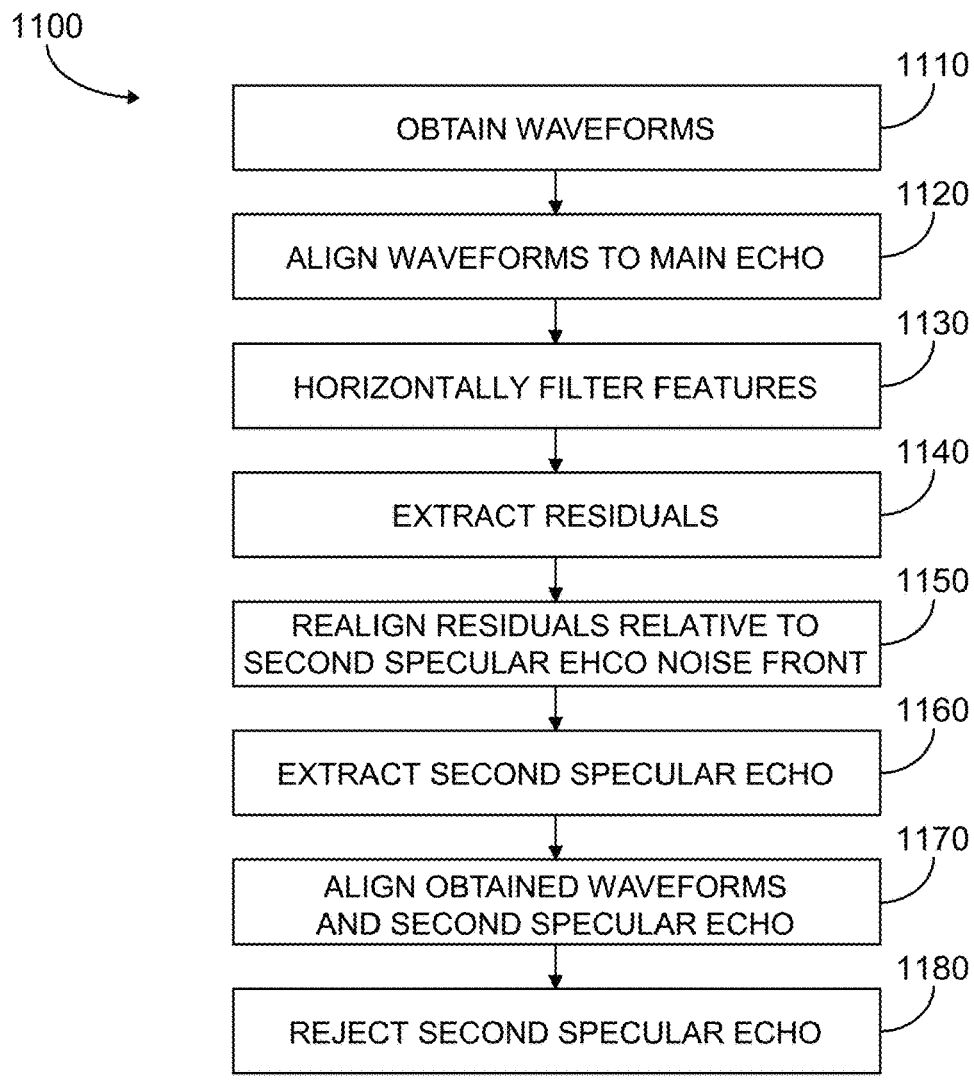
FIG. 27 is a flow-chart diagram of at least a portion of an example implementation of a method according to one or more aspects of the present disclosure.

FIG. 27 is a flow-chart diagram of at least a portion of an example implementation of a method 1100 for such noise extraction according to one or more aspects of the present disclosure. The method 1100 may be utilized in conjunction with, and/or at least partially performed by, the apparatus described herein. For example, the controller 150 and/or surface equipment 190 shown in FIG. 1, the controller 216 and/or surface equipment 290 shown in FIG. 2, the electronics 408 shown in FIG. 4, and/or at least a portion of one or more instances of the processing system 900 shown in FIG. 24 (described below) may be utilized to perform at least a portion of the method 1100.

The method 1100 may include obtaining 1110 the waveforms to be processed. For example, the apparatus depicted in one or more of FIGS. 1-6 and 24 may be utilized to obtain 1110 the waveforms. An example of the obtained 1110 waveforms is depicted in FIG. 26. As a reminder, the obtained 1110 waveforms are depicted in FIG. 26 in initial time-of-arrival order as obtained from the tool.

Figure 28:
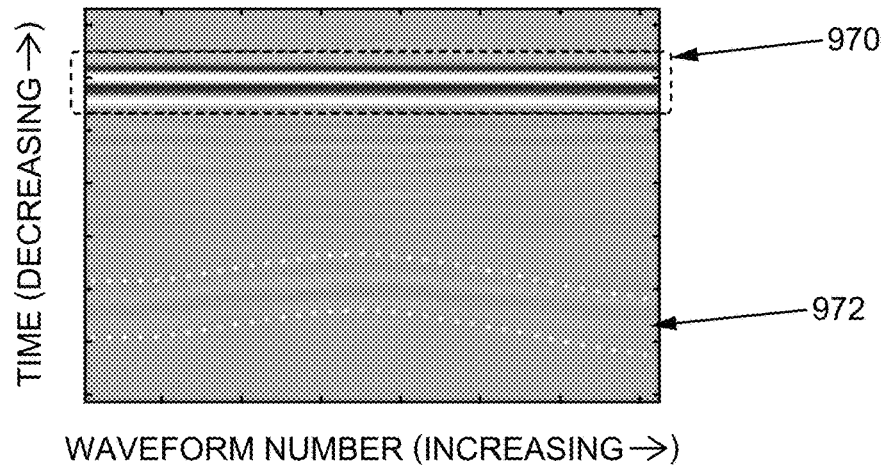
FIG. 28-34 are example waveform plots pertaining to one or more aspects of the present disclosure.

The method 1100 includes aligning 1120 the obtained 1110 waveforms relative to the main echo 970, such as via signal processing performed by processing means of the acoustic tool and/or surface equipment. The waveforms are then fine-aligned, using for instance Fourier phase properties. The amplitude of the main echo may be normalized to have the same maximum value for each waveform. Example results of such "echo-alignment" 1120 are depicted in FIG. 28. It can be seen on this FIG. 28 that the jitter of the time-of-arrival mode shown on FIG. 26 is therefore eliminated, and the main echo pulse is shown as a straight line on the FIG. 28 plot after alignment. The second specular echo 972 is still visible but shows, in view of the alignment respective to the main echo, as an oscillating feature.

Figure 29:
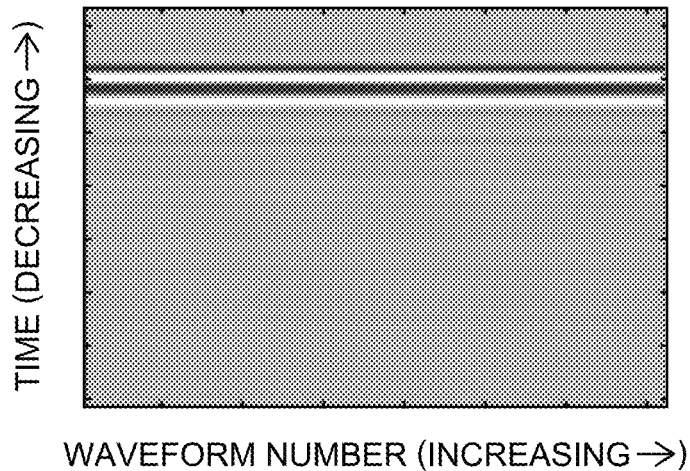

The echo-aligned 1120 waveforms are then subjected to filtering 1130, as depicted in the example results shown in FIG. 29. The filtering 1130 may be referred to as low-pass filtering, which removes quickly-varying, non-horizontal features. Such filtering 1130 is at least strong enough to remove the second specular echo. The same filtering techniques as in operation 630 for removing the tool noise may be used.

Figure 30:
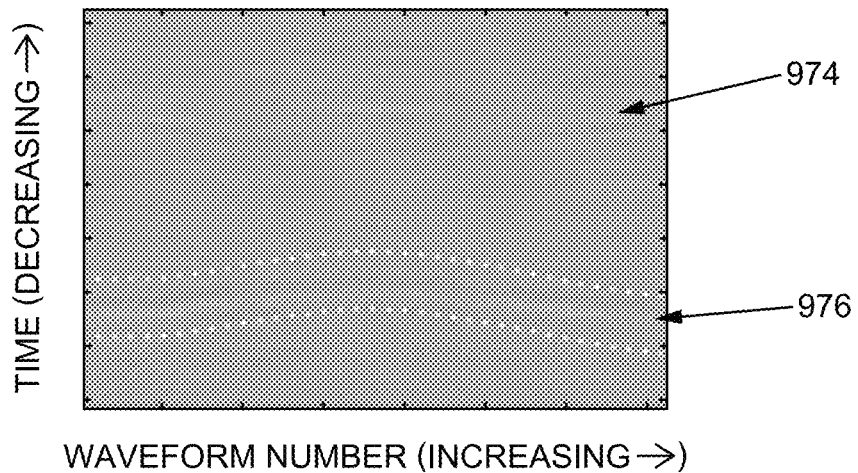

The differences between the aligned 1120 waveforms (FIG. 28) and the filtered 1130 waveforms (FIG. 29) are then extracted 1140 as residuals. Example results of such residual extraction 1140 are depicted in FIG. 30. The residual extraction 1140 contain random wave-residuals 974 and the time-correlated second specular echo 976. The waveform residuals result from the difference between the low-pass filtered waveform and the actual individual waveform from each wave-sample.

Figure 31:
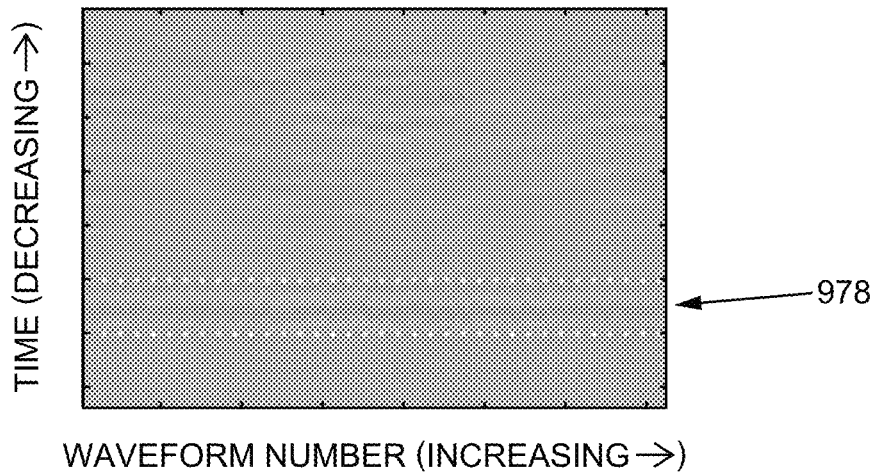

The extracted 1140 residuals are then realigned 1150 with respect to a characteristic time of the second specular echo (as shown in FIG. 31). Aligning the second specular echo relative to the characteristic time, may comprise aligning the location in time of a remarkable point of the second specular echo, such as a noise front, a point of highest amplitude, a first extremum, or a first intersection 515 with the zero-amplitude axis, as already explained in relationship with the main echo. The second specular echo 978 is aligned horizontally after this operation.

Figure 32:
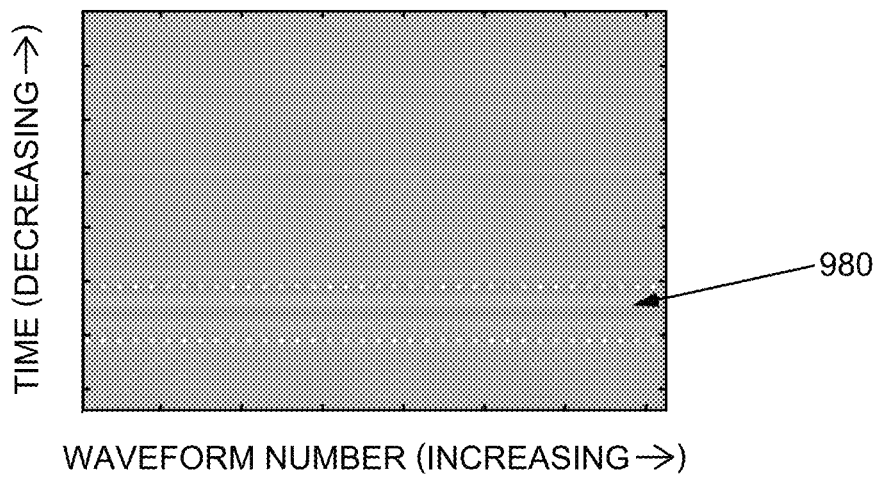
Figure 33:
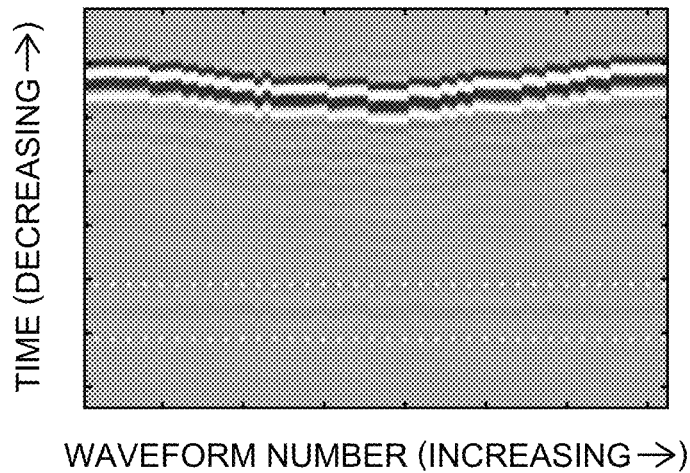
Figure 34:
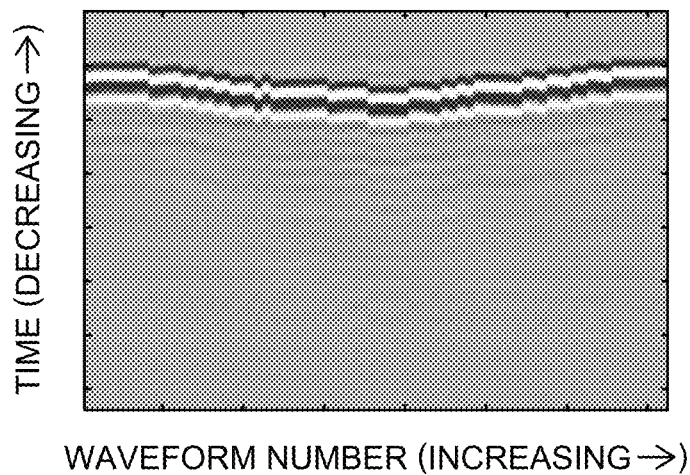

As depicted in FIG. 32, the second specular echo 980 is then extracted 1160 from the realigned 1150 residuals by applying another horizontal, low-pass filter, which may be similar in concept to the horizontal, low-pass filtering 1130 examples described above, but perhaps with different parameters.

The measured waveforms as shown on FIG. 26 and the filtered residuals as shown on FIG. 32 are then both realigned relative to a reference time, for instance relative to a characteristic time of the main echo or the second specular echo but any other reference time might be appropriate. The second specular echo is then rejected 1180 by subtracting the second specular echo 980 from the obtained waveforms both aligned to the reference time. In the embodiment shown here, the measured waveforms are realigned relative to the specular echo characteristic time as can be seen on FIG. 33. The output of the second specular echo rejection is shown on FIG. 34. As can be seen on FIG. 34, the second specular noise is eliminated from the stacked waveforms.

Figure 35:
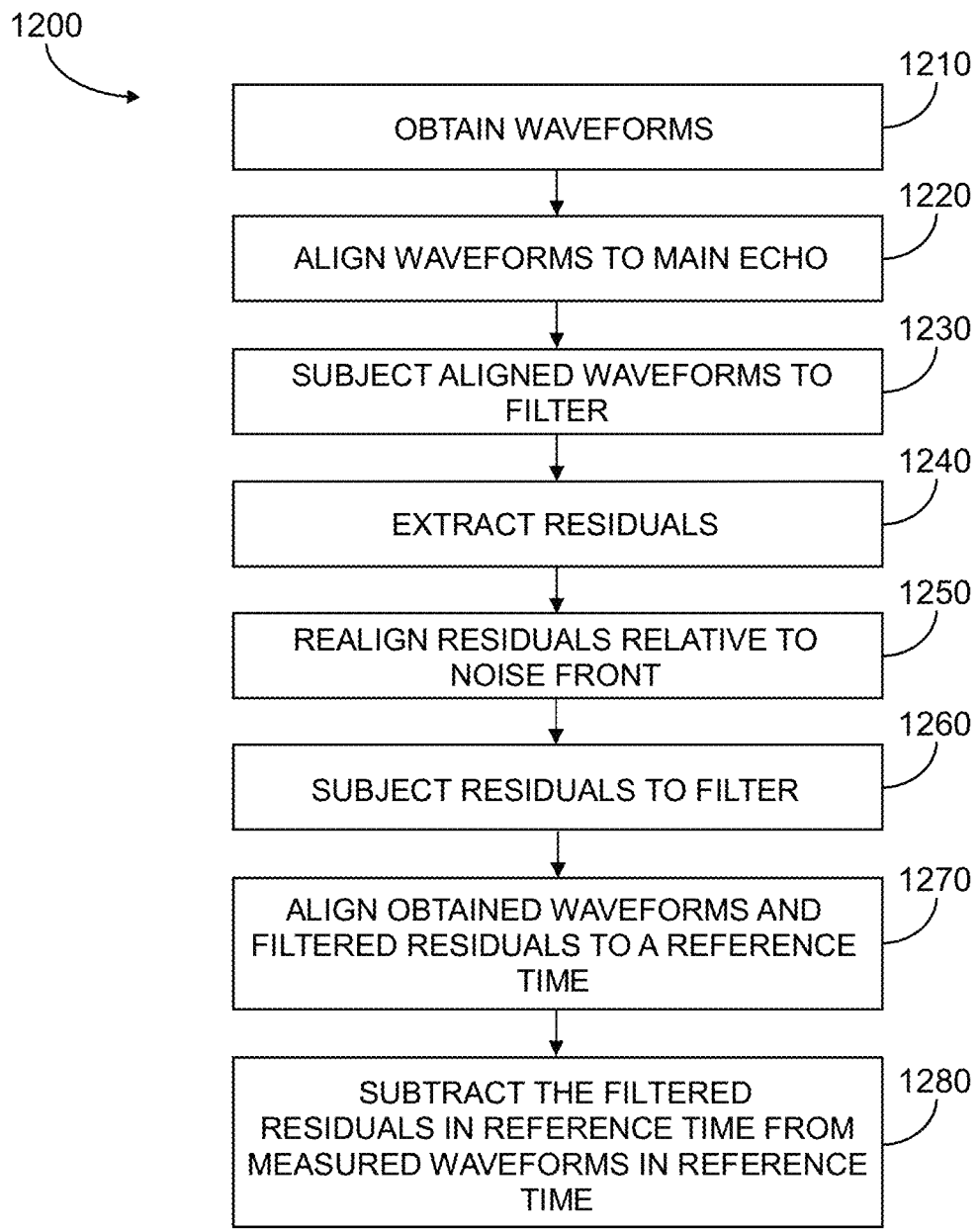
FIG. 35 art diagram of at least a portion of an example implementation of a method according to one or more aspects of the present disclosure.

In view of the entirety of the present disclosure, a person having ordinary skill in the art will recognize that the present disclosure introduces a method 1200 shown generally at FIG. 35 that is performed in order to remove a coherent noise that is non-coherent relative to the main echo. This method comprises obtaining (1210) a plurality of acoustic imaging waveforms measured utilizing a downhole acoustic tool within a wellbore. The plurality of acoustic imaging waveforms are generally stacked together in a configuration that is determined by the tool, generally time-of-arrival determination. The method 1200 also comprises aligning (e.g., in time) (1220) the plurality of measured acoustic imaging relative to a main echo of each waveform; subjecting (1230) the aligned waveforms to a first low-pass filter; extracting residuals (1240) by determining differences between the aligned waveforms and the filtered waveforms; aligning (e.g., in time) (1250) the residuals relative to a characteristic time (i.e. a time corresponding to a remarkable point of the noise waveform) of a noise that is non-coherent relative to the main echo; and subjecting (1260) the aligned residuals to a second low-pass filter. The method then comprises aligning (e.g., in time) (1270) the measured waveforms and the filtered residuals relative to a reference time, for example relative to the main echo or the noise front; and subtracting (1280) the filtered residuals aligned relative to the reference time from the measured waveforms aligned relative to the reference time in order to remove the noise.

The noise in each measured acoustic imaging waveform may be coherent with the noise of the other measured acoustic imaging waveforms of the plurality.

The characteristic time of the noise may be time of a noise front or of a noise extremum, or of a remarkable value of the noise.

In an exemplary embodiment, the noise may be a second specular echo.

In another exemplary embodiment, the noise is a tool noise. In this case, the acoustic imaging waveforms are generated by acoustic firing pulses emitted by the tool, and the characteristic time of the tool noise may correspond to a time of the acoustic firing pulse, which is also a tool noise front. Indeed, the tool noise is detected as soon as the transducer is activated. It relates for instance to noise of the tool electronics.

The first low-pass filter may utilize a sliding-window average.

The second low-pass filter may utilize a sliding-window average.

The first and second low-pass filters may each utilize a sliding-window average.

The method may comprise operating the downhole acoustic tool to obtain the measured waveforms.

The measured waveforms may initially be in a time-of-arrival order, and the method may comprise displaying the de-noised waveforms in the initial time-of-arrival order.

The method may comprise aligning the de-noised waveforms to the corresponding acoustic firing pulses.

The reference time may be one of the characteristic time of the noise or a characteristic time of the main echo. The present disclosure also introduces a method comprising: (A) operating a downhole acoustic tool within a wellbore to obtain a plurality of acoustic imaging waveforms, wherein the downhole acoustic tool is in communication with surface equipment disposed at a wellsite from which the wellbore extends; and (B) operating a processor of the downhole acoustic tool and/or a processor of the surface equipment to: (1) align the obtained waveforms relative to a main echo of each waveform; (2) subject the aligned waveforms to a first low-pass filter; (3) extract residuals by determining differences between the aligned waveforms and the filtered waveforms; (4) align the residuals to a characteristic time of a noise of the obtained waveforms, wherein the noise is non-coherent relative to the main echo; (5) subject the aligned residuals to a second low-pass filter; (6) align in time the filtered residuals and the measured waveforms relative to a reference time, and (7) subtract the filtered residuals aligned relative to the reference time from the measured waveforms aligned relative to the reference time in order to remove the noise.

The noise in each measured acoustic imaging waveform may be coherent with the noise of the other measured acoustic imaging waveforms of the plurality.

The characteristic time of the noise may be time of a noise front or of a noise extremum, or of a remarkable value of the noise.

In an exemplary embodiment, the noise may be a second specular echo.

In another exemplary embodiment, the noise is a tool noise. In this case, the acoustic imaging waveforms are generated by acoustic firing pulses emitted by the tool, and the characteristic time of the tool noise may correspond to a time of the acoustic firing pulse, which is also a tool noise front. Indeed, the tool noise is detected as soon as the transducer is activated. It relates for instance to noise of the tool electronics.

The first low-pass filter may utilizes a sliding-window average.

The second low-pass filter may utilize a sliding-window average.

The first and second low-pass filters may each utilize a sliding-window average.

The obtained waveforms may initially be in a time-of-arrival order, and the method may comprise operating the processor of the downhole acoustic tool and/or the processor of the surface equipment to align the de-noised waveforms to the initial time-of-arrival order.

The present disclosure also introduces a computer program product comprising a non-transitory, tangible, computer-readable storage medium having instructions recorded thereon for causing a processor to: align a plurality of acoustic imaging waveforms measured utilizing a downhole acoustic tool within a wellbore, wherein the aligning is relative to a main echo of each waveform; subject the aligned waveforms to a first low-pass filter; extract residuals by determining differences between the aligned waveforms and the filtered waveforms; align the residuals to a characteristic time of a noise of the obtained waveforms that is non-coherent relative to the main echo; subject the aligned residuals to a second low-pass filter; align in time the filtered residuals and the measured waveforms relative to a reference time, and subtract the filtered residuals aligned relative to the reference time from the measured waveforms aligned relative to the reference time in order to remove the noise.

The computer program may comprise all instructions that are appropriate to execute one or more of the methods that are listed hereinabove.

The present disclosure also relates to a method including aligning acoustic imaging waveforms measured utilizing a downhole acoustic tool within a wellbore. The aligning is relative to a main echo of each waveform. The aligned waveforms are subjected to a first low-pass filter, and residuals are extracted by determining differences between the aligned waveforms and the filtered waveforms. The residuals are aligned relative to corresponding acoustic firing pulses of the downhole acoustic tool in order to identify tool noise or to a second specular echo is order to identify noise relative to such echo. The aligned residuals are subjected to a second low-pass filter. The measured waveforms are aligned to the corresponding acoustic firing pulses when the tool is a tool noise or to the second specular echo when the noise is relative to the second specular echo. More generally, the measured waveforms and filtered residuals are aligned in time relative to a common reference time. Noise associated with the downhole acoustic tool is removed from the measured waveforms utilizing the filtered residuals.

The present disclosure also introduces a method including operating a downhole acoustic tool within a wellbore to obtain acoustic imaging waveforms. The downhole acoustic tool is in communication with surface equipment disposed at a wellsite from which the wellbore extends. The method also includes operating a processor of the downhole acoustic tool and/or a processor of the surface equipment to align the obtained waveforms relative to a main echo of each waveform, subject the aligned waveforms to a first low-pass filter, and extract residuals by determining differences between the aligned waveforms and the filtered waveforms. The processor also aligns the residuals to corresponding acoustic firing pulses of the downhole acoustic tool in order to identify tool noise or to a second specular echo is order to identify noise relative to such echo, and subjects the aligned residuals to a second low-pass filter. The processor also aligns the obtained waveforms to the corresponding acoustic firing pulses when the tool is a tool noise or to the second specular echo when the noise is relative to the second specular echo. More generally, the measured waveforms and filtered residuals are aligned in time relative to a common reference time. The method also removes noise associated with the downhole acoustic tool from the obtained waveforms utilizing the filtered residuals.

The present disclosure also introduces a computer program product including a non-transitory, tangible, computer-readable storage medium having instructions recorded thereon for causing a processor to align acoustic imaging waveforms measured utilizing a downhole acoustic tool within a wellbore. The aligning is relative to a main echo of each waveform. The instructions also cause the processor to subject the aligned waveforms to a first low-pass filter and extract residuals by determining differences between the aligned waveforms and the filtered waveforms. The instructions also cause the processor to align the residuals to corresponding acoustic firing pulses of the downhole acoustic tool, and to subject the aligned residuals to a second low-pass filter. The instructions also cause the processor to align the measured waveforms to the corresponding acoustic firing pulses when the tool is a tool noise or to the second specular echo when the noise is relative to the second specular echo. More generally, the measured waveforms and filtered residuals are aligned in time relative to a common reference time. Noise associated with the downhole acoustic tool is removed from the measured waveforms utilizing the filtered residuals.

The noise reduction aspects introduced herein can provide a significantly more efficient way to cleaning tool noise from acoustic measurement data. Moreover, such noise reduction can be performed without restrictions pertaining to tool eccentering within the wellbore, the presence of collar waveforms, and/or other examples, such that the cleaning introduced herein may be applied substantially universally or, more generally, when the tool noise has a structure (such as a fixed structure for the tool noise or a standoff dependent structure different from the main echo standoff dependence for the second specular echo) in a time reference non-coherent to the signal arrival (main echo) time reference.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same functions and/or achieving the same benefits of the implementations introduced herein. A person having ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to permit the reader to quickly ascertain the nature of the technical disclosure. It is submitted with the understanding that it will not be used to interpret or limit the scope or meaning of the claims.

What is claimed is:

1. A method comprising:
obtaining a plurality of acoustic imaging waveforms measured utilizing a downhole acoustic tool within a wellbore,
aligning in time the plurality of measured acoustic imaging waveforms relative to a main echo of each waveform;
subjecting the aligned waveforms to a first low-pass filter;
extracting residuals by determining differences between the aligned waveforms and the filtered waveforms;
aligning in time the residuals relative to a characteristic time of a noise of the measured waveforms that is non-coherent relative to the main echo;
subjecting the aligned residuals to a second low-pass filter;
aligning in time the filtered residuals and the measured waveforms relative to a reference time,
subtracting the filtered residuals aligned relative to the reference time from the measured waveforms aligned relative to the reference time in order to remove the noise.

2. The method of claim 1, wherein the noise in each measured acoustic imaging waveform is coherent with the noise of the other measured acoustic imaging waveforms of the plurality.

3. The method of claim 1, wherein the characteristic time of the noise is a time of a noise front or of a noise extremum, or of a remarkable value of the noise.

4. The method of claim 1, wherein the noise is a second specular echo.

5. The method of claim 1, wherein the noise is a tool noise.

6. The method of claim 5, wherein the acoustic imaging waveforms are generated by acoustic firing pulses emitted by the tool, and the tool noise characteristic time corresponds to a time of the acoustic firing pulse.

7. The method of claim 1 wherein at least one of the first and second low-pass filter utilizes a sliding-window average.

8. The method of claim 1 wherein the measured waveforms are initially in a time-of-arrival order, and wherein the method further comprises displaying the de-noised waveforms in the initial time-of-arrival order.

9. The method of claim 1, wherein the reference time is one of the characteristic time of the noise or a characteristic time of the main echo.

10. The method of claim 9 wherein at least one of the first and second low-pass filter utilizes a sliding-window average.

11. A method comprising:
operating a downhole acoustic tool within a wellbore to obtain a plurality of acoustic imaging waveforms, wherein the downhole acoustic tool is in communication with surface equipment disposed at a wellsite from which the wellbore extends; and
operating a processor of the downhole acoustic tool and/or a processor of the surface equipment to:
align in time the plurality of obtained waveforms relative to a main echo of each waveform;
subject the aligned waveforms to a first low-pass filter;
extract residuals by determining differences between the aligned waveforms and the filtered waveforms;
align in time the residuals relative to a characteristic time of a noise of the obtained waveforms that is non-coherent relative to the main echo;
subject the aligned residuals to a second low-pass filter;
aligning in time the filtered residuals and the measured waveforms relative to a reference time,
subtracting the filtered residuals aligned relative to the reference time from the measured waveforms aligned relative to the reference time in order to remove the noise.

12. The method of claim 11, wherein the noise in each measured acoustic imaging waveform is coherent with the noise of the other measured acoustic imaging waveforms of the plurality.

13. The method of claim 11, wherein the characteristic time of the noise is a time of a noise front or of a noise extremum, or of a remarkable value of the noise.

14. The method of claim 11, wherein the noise is a second specular echo.

15. The method of claim 11, wherein the noise is a tool noise.

16. The method of claim 11, wherein the acoustic imaging waveforms are generated by acoustic firing pulses emitted by the tool, and the tool noise characteristic time corresponds to a time of the acoustic firing pulse.

17. A computer program product comprising:
a non-transitory, tangible, computer-readable storage medium having instructions recorded thereon for causing a processor to:
align in time a plurality of acoustic imaging waveforms measured utilizing a downhole acoustic tool within a wellbore, wherein the aligning is relative to a main echo of each waveform;
subject the aligned waveforms to a first low-pass filter;
extract residuals by determining differences between the aligned waveforms and the filtered waveforms;
align in time the residuals relative to a characteristic time of a noise of the obtained waveforms that is non-coherent relative to the main echo;
subject the aligned residuals to a second low-pass filter;
aligning in time the filtered residuals and the measured waveforms relative to a reference time,
subtracting the filtered residuals aligned relative to the reference time from the measured waveforms aligned relative to the reference time in order to remove the noise.

18. The computer program product of claim 17, wherein the noise is a second specular echo.

19. The computer program product of claim 17, wherein the noise is a tool noise.

20. The computer program product of claim 17, wherein the characteristic time of the noise is a time of a noise front or of a noise extremum, or of a remarkable value of the noise.

* * * * *